(12) United States Patent
Wang et al.

(10) Patent No.: US 10,885,034 B2
(45) Date of Patent: Jan. 5, 2021

(54) DATA QUERY METHOD AND APPARATUS, AND DATABASE SYSTEM

(71) Applicant: Huawei Technologies Co., Ltd., Shenzhen (CN)

(72) Inventors: Guoping Wang, Shenzhen (CN); Junhua Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 15/992,925

(22) Filed: May 30, 2018

(65) Prior Publication Data

US 2018/0276277 A1 Sep. 27, 2018

Related U.S. Application Data

(63) Continuation of application No. PCT/CN2015/095909, filed on Nov. 30, 2015.

(51) Int. Cl.
*G06F 16/2453* (2019.01)

(52) U.S. Cl.
CPC .. *G06F 16/24544* (2019.01); *G06F 16/24545* (2019.01)

(58) Field of Classification Search
CPC ........ G06F 16/24542; G06F 16/24544; G06F 16/2453; G06F 16/2456
See application file for complete search history.

(56) References Cited

U.S. PATENT DOCUMENTS

| 5,819,255 A | 10/1998 | Celis et al. |
| 6,598,044 B1 | 7/2003 | Waas et al. |
| 6,694,306 B1 | 2/2004 | Nishizawa et al. |

(Continued)

FOREIGN PATENT DOCUMENTS

| CN | 103678589 A | 3/2014 |
| CN | 103714058 A | 4/2014 |

(Continued)

OTHER PUBLICATIONS

Foreign Communication From a Counterpart Application, Japanese Application No. 2018-527925, Japanese Notice of Allowance dated Nov. 5, 2019, 3 pages.

(Continued)

*Primary Examiner* — Ken Hoang
(74) *Attorney, Agent, or Firm* — Conley Rose, P.C.

(57) ABSTRACT

A data query method and apparatus, and a database system, where the method includes receiving a data query request, generating an original query plan according to the data query request, obtaining a candidate query plan set according to the original query plan, restructuring a join predicate in the original query plan, determining basic information of a restructured join predicate in the original query plan, determining a constraint condition of the restructured join predicate in the original query plan, determining an equal-cost query plan for the original query plan according to the basic information of the restructured join predicate in the original query plan and the constraint condition of the restructured join predicate in the original query plan, and performing querying according to the equal-cost query plan for the original query plan. Hence, data query performance can be improved.

20 Claims, 13 Drawing Sheets

(56) References Cited

U.S. PATENT DOCUMENTS

| | | |
|---|---|---|
| 8,086,598 B1 | 12/2011 | Lamb et al. |
| 2002/0059191 A1 | 5/2002 | Tamura |
| 2002/0188600 A1 | 12/2002 | Lindsay et al. |
| 2004/0220923 A1 | 11/2004 | Nica |
| 2008/0133461 A1 | 6/2008 | Nica |
| 2011/0029508 A1* | 2/2011 | Al-Omari ......... G06F 16/24524 707/718 |
| 2013/0173528 A1 | 7/2013 | Betawadkar-Norwood et al. |
| 2013/0297586 A1 | 11/2013 | Singh et al. |
| 2014/0095469 A1 | 4/2014 | Chen et al. |
| 2014/0358894 A1 | 12/2014 | Wei et al. |
| 2015/0324383 A1 | 11/2015 | Goyal et al. |
| 2017/0147644 A1* | 5/2017 | Lee .................. G06F 16/00 |

FOREIGN PATENT DOCUMENTS

| | | |
|---|---|---|
| CN | 104216891 A | 12/2014 |
| CN | 104285222 A | 1/2015 |
| JP | 2001109758 A | 4/2001 |
| JP | 2002024281 A | 1/2002 |
| JP | 2004030677 A | 1/2004 |

OTHER PUBLICATIONS

Machine Translation and Abstract of Chinese Publication No. CN103678589, Mar. 26, 2014, 13 pages.

Moerkotte, G., et al, "Dynamic Programming Strikes Back," SIGMOD'08, Jun. 9-12, 2008, pp. 539-552.

Moerkotte, G., et al, "On the Correct and Complete Enumeration of the Core Search Space," SIGMOD'13, Jun. 22-27, 2013, pp. 493-504.

Rao, J., et al, "Using EELs, a Practical Approach to Outerjoin and Antijoin Reordering," 2001, pp. 585-594.

Foreign Communication From a Counterpart Application, PCT Application No. PCT/CN2015/095909, English Translation of International Search Report dated Aug. 22, 2016, 2 pages.

Foreign Communication From a Counterpart Application, PCT Application No. PCT/CN2015/095909, English Translation of Written Opinion dated Aug. 22, 2016, 5 pages.

Foreign Communication From a Counterpart Application, European Application No. 15909443.2, Extended European Search Report dated Aug. 8, 2018, 11 pages.

\* cited by examiner

| a | b |
|---|---|
| 1 | 2 |
| 1 | 5 |

R

Join predicate P: R.b=S.c

| c | d |
|---|---|
| 2 | 1 |
| 2 | 6 |
| 3 | 4 |

S

| a | b | c | d |
|---|---|---|---|
| 1 | 2 | 2 | 1 |
| 1 | 2 | 2 | 6 |

Result of an inner join between R and S

| a | b | c | d |
|---|---|---|---|
| 1 | 2 | 2 | 1 |
| 1 | 2 | 2 | 6 |
| 1 | 5 | null | null |

Result of a left outer join between R and S

| a | b | c | d |
|---|---|---|---|
| 1 | 2 | 2 | 1 |
| 1 | 2 | 2 | 6 |
| null | null | 3 | 4 |

Result of a right outer join between R and S

| a | b | c | d |
|---|---|---|---|
| 1 | 2 | 2 | 1 |
| 1 | 2 | 2 | 6 |
| 1 | 5 | null | null |
| null | null | 3 | 4 |

Result of a full outer join between R and S

| a | b |
|---|---|
| 1 | 2 |

Result of a left semi-join between R and S

| c | d |
|---|---|
| 2 | 1 |
| 2 | 6 |

Result of a right semi-join between R and S

| a | b |
|---|---|
| 1 | 5 |

Result of a left anti-join between R and S

| c | d |
|---|---|
| 3 | 4 |

Result of a right anti-join between R and S null: null

FIG. 1C

DATA QUERY METHOD AND APPARATUS, AND DATABASE SYSTEM

CROSS-REFERENCE TO RELATED APPLICATION

This application is a continuation of International Patent Application No. PCT/CN2015/095909 filed on Nov. 30, 2015, which is hereby incorporated by reference in its entirety.

TECHNICAL FIELD

The present disclosure relates to the field of information technologies, and in particular, to a data query method and apparatus, and a database system.

BACKGROUND

A structured query language (SQL) is a standard language of a relational database management system. The SQL is an advanced descriptive non-procedural language. That is, the SQL allows a user to obtain required data on a high-layer data structure, but the SQL does not require the user to specify a method for obtaining the data, that is, a query plan in a general sense. The query plan may be represented by a tree. A leaf node of the tree indicates an input table, and an intermediate node indicates an operation. An SQL query usually has many equal-cost query plans, and execution times of different query plans vary. Therefore, in a database system, there is a query optimizer component for selecting an optimal (that is, an execution time is the shortest) query plan.

A main function of the query optimizer is to determine an equal-cost query plan for an original query plan and to select an optimal query plan. However, in other approaches, some equal-cost query plans are omitted, and consequently query performance is affected.

SUMMARY

Embodiments of the present disclosure provide a data query method and apparatus, and a database system in order to improve data query performance.

According to a first aspect, an embodiment of the present disclosure provides a data query method, where the method is executed by a database system, the database system runs on a computer device, and the method includes receiving a data query request, generating an original query plan according to the data query request, restructuring a join predicate in the original query plan, determining basic information of a restructured join predicate in the original query plan, determining, based on a join operation rule, a constraint condition of the restructured join predicate in the original query plan, determining an equal-cost query plan for the original query plan according to the basic information of the restructured join predicate in the original query plan and the constraint condition of the restructured join predicate in the original query plan, and performing querying according to the equal-cost query plan for the original query plan.

In the embodiments of the present disclosure, the equal-cost query plan for the original query plan is determined according to the basic information of the predicate and the constraint condition obtained based on the join operation rule, and a relatively large quantity of equal-cost query plans for the original query plan can be obtained such that data query performance can be improved.

In some implementations, determining an equal-cost query plan for the original query plan according to the basic information of the restructured join predicate in the original query plan and the constraint condition of the restructured join predicate in the original query plan includes determining an equal-cost query plan set for the original query plan according to the basic information of the restructured join predicate in the original query plan and the constraint condition of the restructured join predicate in the original query plan, and performing querying according to the equal-cost query plan for the original query plan includes selecting a query plan from the equal-cost query plan set to perform querying.

In some implementations, the method further includes obtaining a candidate query plan set according to the original query plan, where candidate query plans for the original query plan should be obtained as much as possible herein, and preferably, a query plan enumeration algorithm may be used to enumerate all candidate query plans for the original query plan, and a typical enumeration algorithm may be used, for example, a dynamic programming algorithm used in International Business Machines (IBM) Corporation System R, and determining an equal-cost query plan set for the original query plan according to the basic information of the restructured join predicate in the original query plan and the constraint condition of the restructured join predicate in the original query plan includes determining the equal-cost query plan set from the candidate query plan set according to the basic information of the restructured join predicate in the original query plan and the constraint condition of the restructured join predicate in the original query plan.

In the embodiments of the present disclosure, the equal-cost query plan for the original query plan is determined from the candidate query plan set according to the basic information of the predicate and the constraint condition obtained based on the join operation rule, and all equal-cost query plans for the original query plan can be obtained such that data query performance can be further improved.

In some implementations, restructuring a join predicate in the original query plan includes transforming all join predicates of an inner join operation in the original query plan into a conjunctive normal form (CNF), and combining join predicates having a same input table, and combining all join predicates of a non-inner join operation in the original query plan into one join predicate.

In some implementations, the basic information of the join predicate includes an input table of the join predicate, an input table of the join predicate that is included in a left subtree of a join operation in which the join predicate is located, an input table of the join predicate that is included in a right subtree of the join operation in which the join predicate is located, and a join type of the join operation in which the join predicate is located.

In some implementations, the join operation rule includes an operational-level rule and a predicate-level rule, where the operational-level rule includes an operational-level exchange rule $e_1 \, o^a_{p12} \, e_2 = e_2 \, o^a_{p12} \, e_1$, an operational-level combination rule $(e_1 \, o^a_{p12} \, e_2) \, o^b_{p23} \, e_3 = e_1 \, o^a_{p12} \, (e_2 \, o^b_{p23} \, e_3)$, an operational-level left-permutation rule $(e_1 \, o^a_{p12} \, e_2) \, o^b_{p13} \, e_3 = (e_1 \, o^b_{p13} \, e_3) \, o^a_{p12} \, e_2$, and an operational-level right-permutation rule $e_1 \, o^a_{p13} \, (e_2 \, o^b_{p23} \, e_3) = e_2 \, o^b_{p23} \, (e_1 \, o^a_{p13} \, e_3)$, the predicate-level rule includes a predicate-level combination rule $(e_1 \, o^a_{p12} \, e_2) \, o^b_{p \wedge p23} \, e_3 = e_1 \, o^a_{p12 \wedge p} \, (e_2 \, o^b_{p23} \, e_3)$, a predicate-level left-permutation rule $(e_1 \, o^a_{p12} \, e_2)^b_{p13 \wedge p} \, e_3 = (e_1 \, o^b_{p13} \, e_3) \, o^a_{p12 \wedge p} \, e_2$, and a predicate-level right-permutation rule $e_1 \, o^a_{p \wedge p13} \, (e_2 \, o^b_{p23} \, e_3) = e_2 \, o^b_{p \wedge p23} \, (e_1 \, o^a_{p13} \, e_3)$, $e_i$ is a query expression, $o^a$ and $o^b$ are join operations, and pij is a join predicate between $e_i$ and $e_j$.

In some implementations, determining, based on a join operation rule, a constraint condition of the restructured join predicate in the original query plan includes traversing, for each join operation node $o^B$ in the original query plan, each join operation node $o^A$ in a subtree that uses $o^B$ as a root node, and when $o^A$ is in a left subtree of the subtree that uses $o^B$ as the root node, if $o^A$ and $o^B$ do not satisfy the operational-level combination rule and the predicate-level combination rule, adding a first constraint condition to each restructured join predicate on $o^B$, and if $o^A$ and $o^B$ do not satisfy the operational-level left-permutation rule and the predicate-level left-permutation rule, adding a second constraint condition to each restructured join predicate on $o^B$, or when $o^A$ is in a right subtree of the subtree that uses $o^B$ as the root node, if $o^A$ and $o^B$ do not satisfy the operational-level combination rule and the predicate-level combination rule, adding a second constraint condition to each restructured join predicate on $o^B$, and if $o^A$ and $o^B$ do not satisfy the operational-level right-permutation rule and the predicate-level right-permutation rule, adding a first constraint condition to each restructured join predicate on $o^B$, where the first constraint condition is $T(e_2) \rightarrow T(e_1) \cap T(p_{a1} \wedge p_{a2} \wedge \ldots \wedge p_{an})$, the second constraint condition is $T(e_1) \rightarrow T(e_2) \cap T(p_{a1} \wedge p_{a2} \wedge \ldots \wedge p_{an})$, $T(e_1)$ indicates an original input table included in a left subtree $e_1$ of a subtree that uses $o^A$ as a root node, $T(e_2)$ indicates an original input table included in a right subtree $e_2$ of the subtree that uses $o^A$ as the root node, $T(p_{a1} \wedge p_{a2} \wedge \ldots \wedge p_{an})$ indicates an original input table included in a restructured join predicate $p_{a1} \wedge p_{a2} \wedge \ldots \wedge p_{an}$ on $o^A$, and $T_1 \rightarrow T_2$ indicates that if a first subtree that uses a join operation in which a join predicate constrained by $T_1 \rightarrow T_2$ is located as a root node includes any input table in $T_1$, the first subtree includes all input tables in $T_2$.

In some implementations, determining an equal-cost query plan for the original query plan according to the basic information of the restructured join predicate in the original query plan and the constraint condition of the restructured join predicate in the original query plan includes determining that a first candidate query plan P' is an equal-cost query plan for the original query plan P if P' satisfies the following conditions, where a join type of each first join operation of P' is an inner join, the first join operation is a join operation having at least two restructured join predicates, and a join type of a join operation that is in P and that is corresponding to each join predicate in the at least two restructured join predicates is an inner join, for each join predicate p on each join operation $o^{b'}$ in P', when $o^{b'}$ does not satisfy the operational-level exchange rule, $T_l(p)$ in P' and $T_l(p)$ in P are equal, and $T_r(p)$ in P' and $T_r(p)$ in P are equal, where $T_l(p)$ indicates an input table of p included in a left subtree of a join operation in which p is located, and $T_r(p)$ indicates an input table of p included in a right subtree of the join operation in which p is located, or when $o^{b'}$ satisfies the operational-level exchange rule, $T_l(p)$ in V and $T_l(p)$ in P are equal, and $T_r(p)$ in P' and $T_r(p)$ in P are equal, or $T_l(p)$ in P' and $T_r(p)$ in P are equal, and $T_r(p)$ in P' and $T_l(p)$ in P are equal, and for each join predicate p on each join operation $o^{b'}$ in P', p satisfies a constraint condition for p in P.

In some implementations, selecting a query plan from the equal-cost query plan set to perform querying includes selecting a query plan with minimum costs from the equal-cost query plan set to perform querying.

According to a second aspect, an embodiment of the present disclosure provides a data query apparatus. The apparatus includes a module for executing the method according to the first aspect.

According to a third aspect, an embodiment of the present disclosure provides a data query apparatus. The apparatus includes a processor, a memory, and a communications interface. The processor is coupled to the memory and the communications interface. The memory is configured to store an instruction, the processor is configured to execute the instruction, and the communications interface is configured to communicate with another network element under control of the processor. The processor executes the method according to the first aspect when the processor executes the instruction.

According to a fourth aspect, an embodiment of the present disclosure provides a database system. The database system includes the data query apparatus according to the second aspect or the third aspect and a database.

In some implementations, an equal-cost query plan for an original query plan is a query plan obtained from the original query plan by means of transformation using at least one of four operational-level rules and three predicate-level rules.

In some implementations, an equal-cost query plan space includes query plans obtained from an original query plan by means of transformation using at least one of four operational-level rules and three predicate-level rules.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 1C is an example of a join operation according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1A:
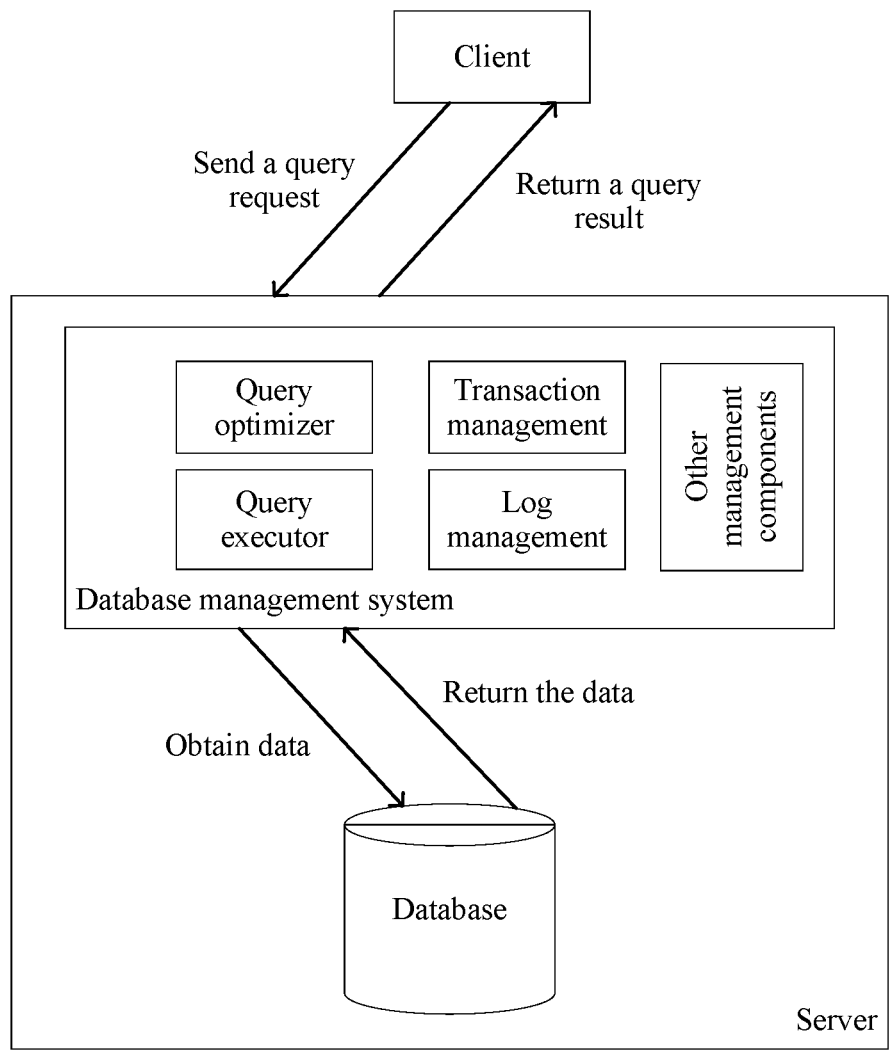
FIG. 1A and FIG. 1B are schematic diagrams of application scenarios according to an embodiment of the present disclosure.
Figure 1B:
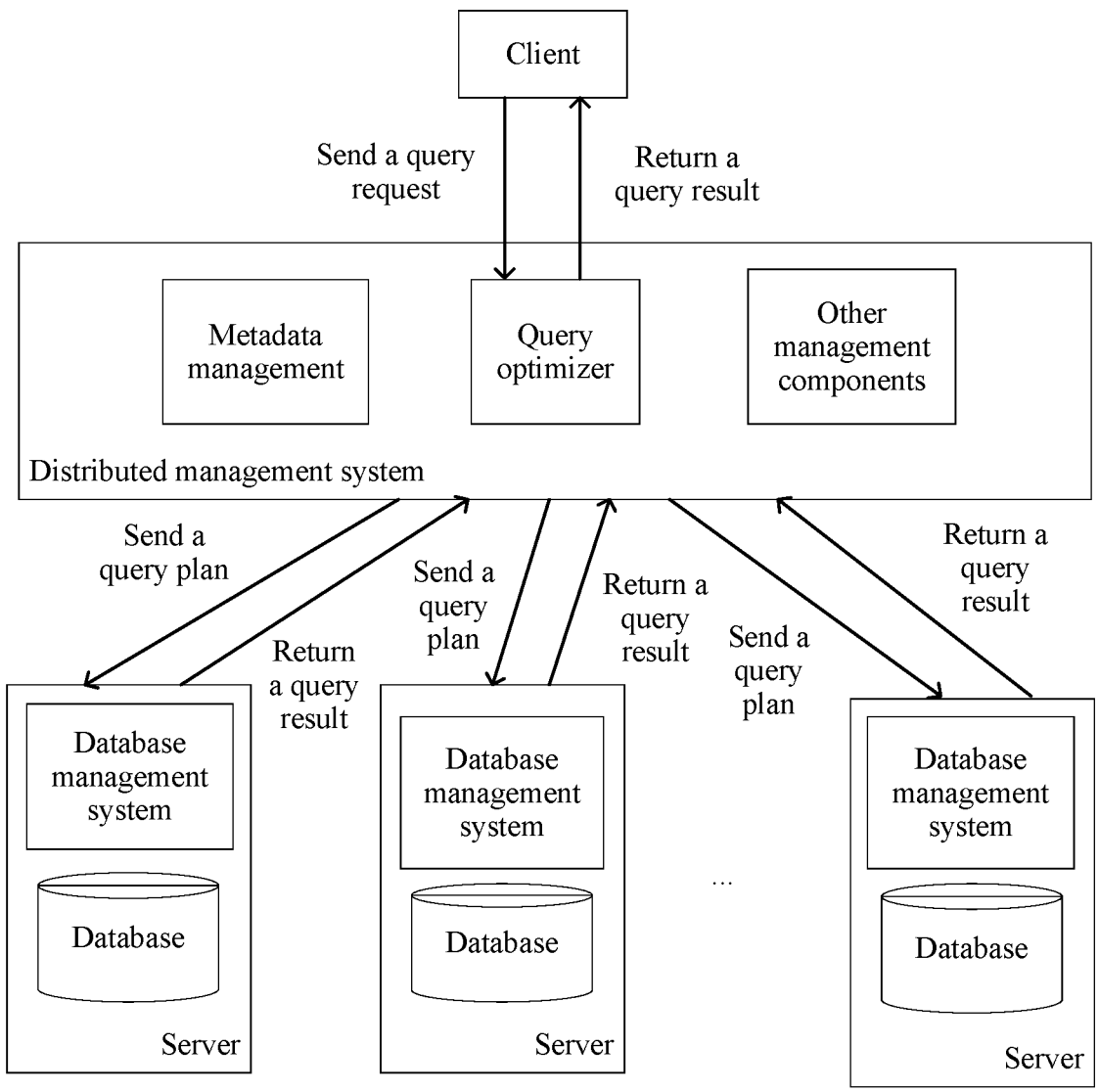

The technical solutions in the embodiments of the present disclosure may be applied to a database system. FIG. 1A and FIG. 1B are schematic diagrams of application scenarios according to an embodiment of the present disclosure. FIG. 1A is a database system with a single server, and FIG. 1B is a distributed database system.

As shown in FIG. 1A, the database system (that is, a server) with a single server includes a database management system and a database, and is configured to process a query request of a client and return a query result to the client. The database management system includes a management component such as a query optimizer, and is configured to manage the database system. For this scenario, a method in the embodiments of the present disclosure may be executed by the server, or the database management system in the server, or the query optimizer in the database management system.

As shown in FIG. 1B, the distributed database system includes a plurality of servers and a distributed management system, and is configured to process a query request of a client and return a query result to the client. Each server includes a database management system and a database, and the distributed management system includes a management component such as a query optimizer, and is configured to manage the distributed database system. For this scenario, a method in the embodiments of the present disclosure may be executed by the distributed database system, the distributed management system in the distributed database system, or the query optimizer in the distributed management system.

For ease of understanding the embodiments of the present disclosure, the following first describes terms related to a database system.

In various embodiments of the present disclosure, a join operation may also be referred to as an operation or a join, and the join operation combines two or more tables in a database into one result table. A join predicate may also be referred to as a predicate, and the join predicate is used to describe a relationship of columns in two or more tables. The join operation combines tables in a database using the join predicate.

The join operation is classified into an inner join, a left/right outer join, a full outer join, a left/right semi-join, and a left/right anti-join.

The inner join is the most common join operation in a database. The inner join combines columns of two tables (for example, R and S) together based on a join predicate to generate a new result table. The operation compares each row of the table R with each row of the table S, and finds a combination that satisfies the join predicate. When the join predicate is satisfied, matched rows in R and S are combined into one row in a result table by column (side by side).

The left outer join is an expansion of the inner join. A difference between the left outer join and the inner join is that if the left outer join is performed for the two tables R and S, if there is no matched row in the right table S for a row in a left table (that is, the table R) to satisfy the join predicate, instead of directly discarding a value in the row of the left table in the inner join, the left outer join still returns a record, where the record retains all column values in the left table, but a value in each column corresponding to the row from the right table is null. The right outer join is similar to the left outer join, and the only difference is that if there is no matched row in the left table for a row in the right table, a value in each column from the left table in a record returned by the operation is null. The full outer join is similar to the left/right outer join, and the only difference is that regardless of the left table or the right table, if there is no matched row for a row in the table, the operation returns a record, and a column value in the table with no matched row in the record is null.

The left semi-join returns only those rows, in the left table, that have matched rows in the right table (that is, satisfying the join predicate). The right semi-join returns only those rows, in the right table, that have matched rows in the left table (that is, satisfying the join predicate).

The left anti-join returns only those rows, in the left table, that have no matched row in the right table (that is, not satisfying the join predicate). The right anti-join returns only those rows, in the right table, that have no matched row in the left table (that is, satisfying the join predicate). It can be learned from definitions of the semi-join and the anti-join that the anti-join and the semi-join are complementary sets for each other.

FIG. 1C shows examples of the foregoing various join operations. In FIG. 1C, a join operation performed for the table R and the table S is used as an example. The join predicate is R.b=S.c, and results of the various join operations are shown in FIG. 1C.

Figure 2:
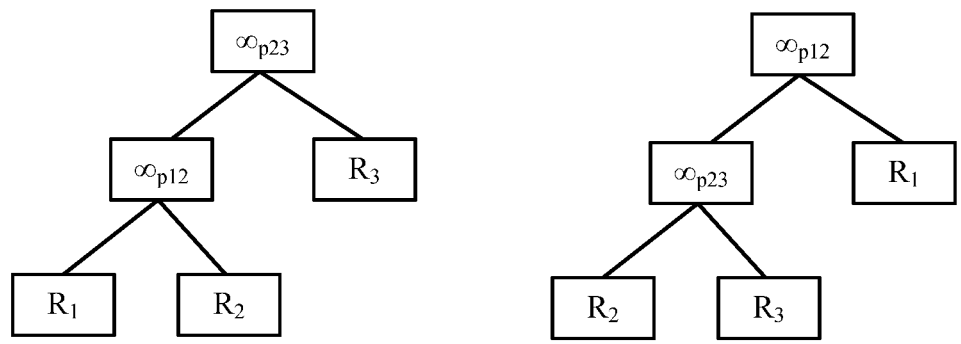
FIG. 2 is an example of an equal-cost query plan according to an embodiment of the present disclosure.

FIG. 2 shows an example of an equal-cost query plan. As shown in FIG. 2, for an SQL query $R_1 \infty_{p12} R_2 \infty_{p23} R_3$, $R_1$, $R_2$, and $R_3$ represent input tables, co represents an inner join operation, and p12 and p23 represent a join predicate between $R_1$ and $R_2$ and a join predicate between $R_2$ and $R_3$ respectively. Both two query plans in FIG. 2 are equal-cost query plans for the query.

In various embodiments of the present disclosure, a join operation rule includes an operational-level rule and a predicate-level rule. The operational-level rule includes an operational-level exchange rule, an operational-level combination rule, an operational-level left-permutation rule, and an operational-level right-permutation rule. The predicate-level rule includes a predicate-level combination rule, a predicate-level left-permutation rule, and a predicate-level right-permutation rule. In the following description, meaning of each symbol is shown in Table 1.

TABLE 1

| Symbol | Explanation |
|---|---|
| $e_i$ | Query expression |
| $o^a, o^b$ | Join operation |
| Pij | Join predicate between $e_i$ and $e_j$ |
| $A(e_i)$ | All attribute sets in $e_i$ |
| pij rejects null on $A(e_i)$ | If all attribute values in $A(e_i)$ are null, a calculation result of pij is unknown or false |

Figure 3:
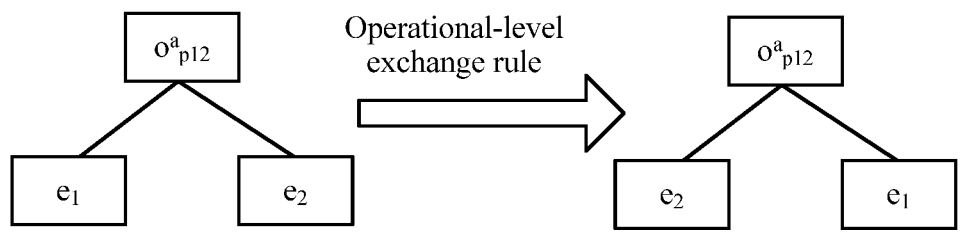
FIG. 3 is an example of an operational-level exchange rule according to an embodiment of the present disclosure.

The operational-level exchange rule is $e_1 \, o^a_{p12} \, e_2 = e_2 \, o^a_{p12} \, e_1$. FIG. 3 is an example of the operational-level exchange rule. Table 2 is a join operation table of the operational-level exchange rule, and shows whether each join operation satisfies the operational-level exchange rule. + indicates that the join operation satisfies the operational-level exchange rule, and − indicates that the join operation does not satisfy the operational-level exchange rule. It should be understood that the right outer join, the right semi-join, and the right anti-join may be transformed into corresponding left join operations, and therefore only left join operations are considered in this specification.

TABLE 2

| $o^a$ | Inner join | Left semi-join | Left anti-join | Left outer join | Full outer join |
|---|---|---|---|---|---|
| Operational-level exchange rule | + | − | − | − | + |

Figure 4:
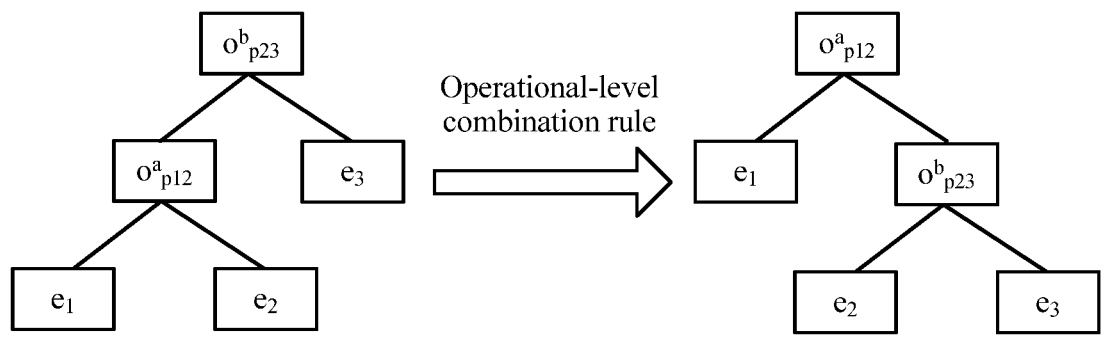
FIG. 4 is an example of an operational-level combination rule according to an embodiment of the present disclosure.

The operational-level combination rule is $(e_1 \, o^a_{p12} \, e_2) \, o^b_{p23} \, e_3 = e_1 \, o^a_{p12} \, (e_2 \, o^b_{p23} \, e_3)$. FIG. 4 is an example of the operational-level combination rule. Table 3 is a join operation table of the operational-level combination rule, and shows whether any two join operations satisfy the operational-level combination rule. + indicates that the two join operations satisfy the operational-level combination rule, and − indicates that the two join operations do not satisfy the operational-level combination rule. + with a superscript indicates that the combination rule is satisfied under a condition. That is, only when a condition in the superscript is satisfied, the two corresponding join operations can satisfy the combination rule.

TABLE 3

| | Inner join | Left semi-join | Left anti-join | Left outer join | Full outer join |
|---|---|---|---|---|---|
| Inner join | + | + | + | + | − |
| Left semi-join | − | − | − | − | − |
| Left anti-join | − | − | − | − | − |
| Left outer join | − | − | − | +[1] | − |
| Full outer join | − | − | − | +[1] | +[2] |

Figure 5:
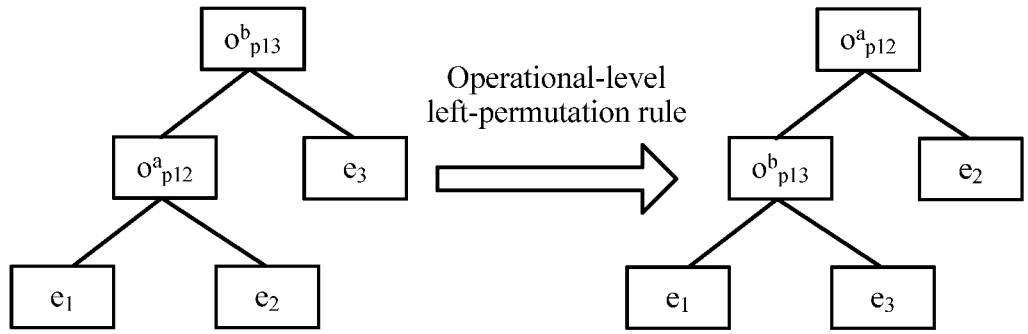
FIG. 5 is an example of an operational-level left-permutation rule according to an embodiment of the present disclosure.

[1] $p_{23}$ rejects null on $A(e_2)$
[2] $p_{12}$ and $p_{23}$ rejects null on $A(e_2)$ The operational-level left-permutation rule is $(e_1 \, o^a_{p12} \, e_2) \, o^b_{p13} \, e_3 = (e_1 \, o^b_{p13} \, e_3) \, o^a_{p12} \, e_2$. FIG. 5 is an example of the operational-level left-permutation rule. Table 4 is a join operation table of the operational-level left-permutation rule, and shows whether any two join operations satisfy the operational-level left-permutation rule. + indicates that the two join operations satisfy the operational-level left-permutation rule, and − indicates that the two join operations do not satisfy the operational-level left-permutation rule. + with a superscript indicates that the left-permutation rule is satisfied under a condition. That is, only when a condition in the superscript is satisfied, the two corresponding join operations can satisfy the left-permutation rule.

TABLE 4

| | Inner join | Left semi-join | Left anti-join | Left outer join | Full outer join |
|---|---|---|---|---|---|
| Inner join | + | + | + | + | − |
| Left semi-join | + | + | + | + | − |
| Left anti-join | + | + | + | + | − |
| Left outer join | + | + | + | + | +[1] |
| Full outer join | − | − | − | +[2] | +[3] |

Figure 6:
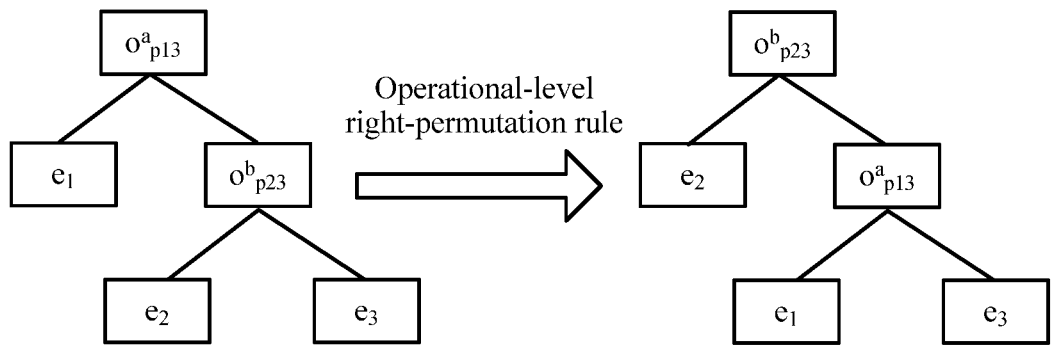
FIG. 6 is an example of an operational-level right-permutation rule according to an embodiment of the present disclosure.

[1] $p_{12}$ rejects null on $A(e_1)$
[2] $p_{13}$ rejects null on $A(e_3)$
[3] $p_{12}$ and $p_{13}$ rejects null on $A(e_1)$ The operational-level right-permutation rule is $e_1 \, o^a_{p13} \, (e_2 \, o^b_{p23} \, e_3) = e_2 \, o^b_{p23} \, (e_1 \, o^a_{p13} \, e_3)$. FIG. 6 is an example of the operational-level right-permutation rule. Table 5 is a join operation table of the operational-level right-permutation rule, and shows whether any two join operations satisfy the operational-level right-permutation rule. + indicates that the two join operations satisfy the operational-level right-permutation rule, and − indicates that the two join operations do not satisfy the operational-level right-permutation rule. + with a superscript indicates that the right-permutation rule is satisfied under a condition. That is, only when a condition in the superscript is satisfied, the two corresponding join operations can satisfy the right-permutation rule.

TABLE 5

| | Inner join | Left semi-join | Left anti-join | Left outer join | Full outer join |
|---|---|---|---|---|---|
| Inner join | + | − | − | − | − |
| Left semi-join | − | − | − | − | − |
| Left anti-join | − | − | − | − | − |
| Left outer join | − | − | − | − | − |
| Full outer join | − | − | − | − | +[1] |

[1] $p_{13}$ and $p_{13}$ rejects null on $A(e_3)$

In the foregoing operational-level rule, a join predicate in an operation and the operation are bound together, that is, the join predicate cannot move between operations. Different from the operational-level rule, in a predicate-level rule, a predicate can move between operations.

Figure 7:
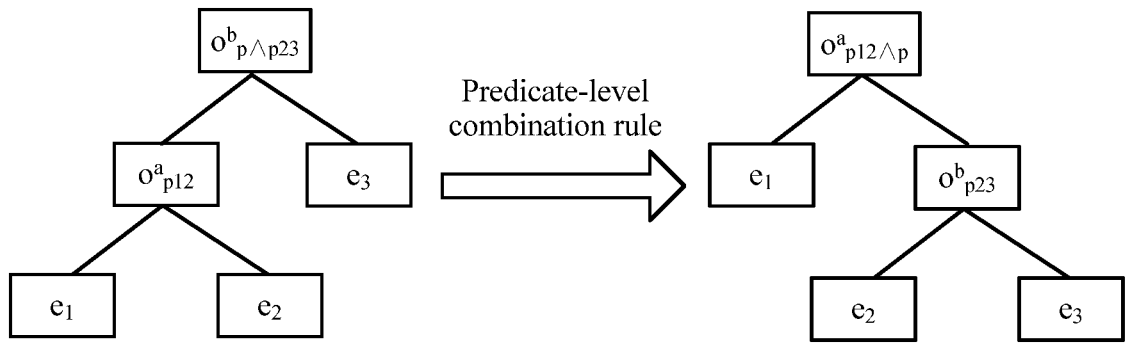
FIG. 7 is an example of a predicate-level combination rule according to an embodiment of the present disclosure.

The predicate-level combination rule is $(e_1 \, o^a_{p12} \, e_2) \, o^b_{p \wedge p23} \, e_3 = e_1 \, o^a_{p12 \wedge p} \, (e_2 \, o^b_{p23} \, e_3)$. $\wedge$ indicates an AND logical operation, p indicates a join predicate except p23, and p is not null. FIG. 7 is an example of the predicate-level combination rule.

Figure 8:
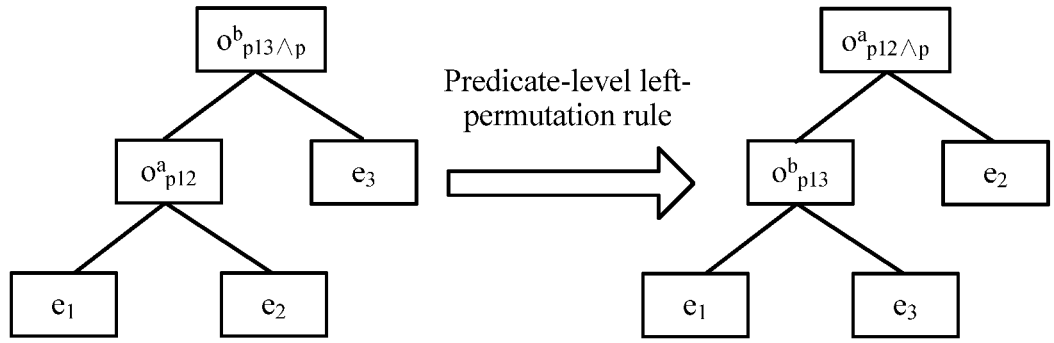
FIG. 8 is an example of a predicate-level left-permutation rule according to an embodiment of the present disclosure.

The predicate-level left-permutation rule is $(e_1 \, o^a_{p12} \, e_2) \, o^b_{p13 \wedge p} \, e_3 = (e_1 \, o^b_{p13} \, e_3) \, o^a_{p12 \wedge p} \, e_2$. $\wedge$ indicates an AND logical operation, p indicates a join predicate except p13, and p is not null. FIG. 8 is an example of the predicate-level left-permutation rule.

Figure 9:
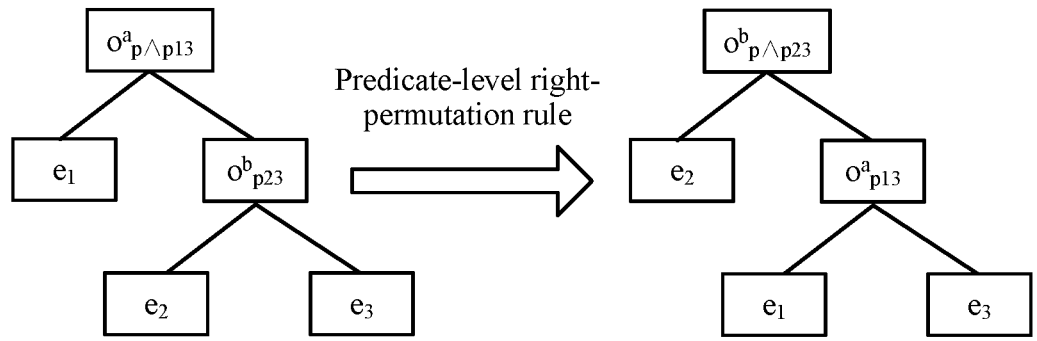
FIG. 9 is an example of a predicate-level right-permutation rule according to an embodiment of the present disclosure.

The predicate-level right-permutation rule is $e_1 \; o^a_{p \wedge p13}$ $(e_2 \; o^b_{p23} \; e_3) = e_2 \; o^b_{p \wedge p23} \; (e_1 \; o^a_{p13} \; e_3)$. $\wedge$ indicates an AND logical operation, p indicates a join predicate except p13, and p is not null. FIG. 9 is an example of the predicate-level right-permutation rule.

Table 6 is a join operation table of the predicate-level rule, and shows whether any two join operations satisfy the predicate-level rule. + indicates that the two join operations satisfy the predicate-level rule, and − indicates that the two join operations do not satisfy the predicate-level rule. Join operation tables of the foregoing three predicate-level rules are the same, that is, Table 6 represents the join operation tables of all the three predicate-level rules.

TABLE 6

|  | Inner join | Left semi-join | Left anti-join | Left outer join | Full outer join |
| --- | --- | --- | --- | --- | --- |
| Inner join | + | − | − | − | − |
| Left semi-join | − | − | − | − | − |
| Left anti-join | − | − | − | − | − |
| Left outer join | − | − | − | − | − |
| Full outer join | − | − | − | − | − |

In the embodiments of the present disclosure, all query plans that can be obtained by means of transformation using the foregoing operational-level rules or predicate-level rules are equal-cost query plans. That is, an equal-cost query plan space in the embodiments of the present disclosure is all the query plans that can be obtained by means of transformation using at least one of the four operational-level rules and the three predicate-level rules. Whether a rule is satisfied between operations may be determined by querying a join operation table of the rule.

Figure 10:
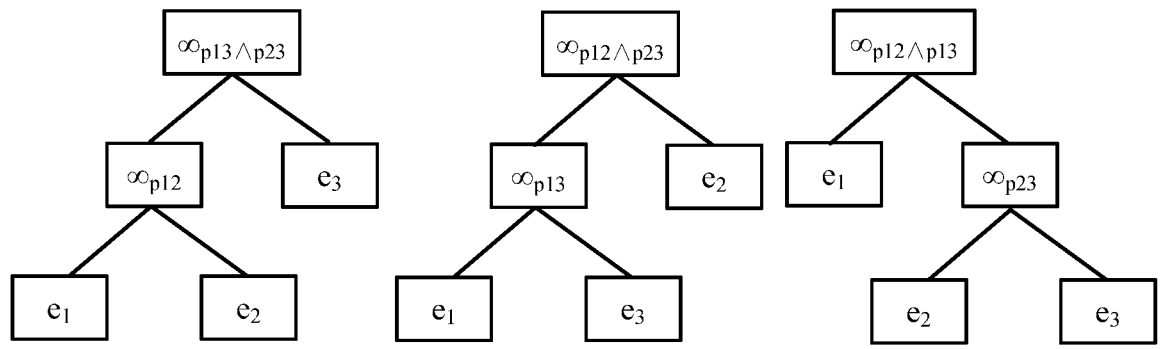
FIG. 10 is an example of an equal-cost query plan according to an embodiment of the present disclosure.

Compared with an equal-cost query plan space obtained by means of transformation using only the operational-level rule, the equal-cost query plan space in the embodiments of the present disclosure is more complete. That is, if transformation is performed using only the operational-level rule, not all equal-cost query plans can be obtained. For example, as shown in FIG. 10, relative to a left original query plan, a join predicate between operations is moved in two right candidate query plans, and therefore the two candidate query plans cannot be obtained by transforming the left original query plan using the foregoing four operational-level rules. However, the two right candidate query plans are actually equivalent to the left original query plan.

In the embodiments of the present disclosure, an equal-cost query plan for an original query plan is determined based on the operational-level rules and the predicate-level rules, and all equal-cost query plans for the original query plan can be obtained.

Figure 11:
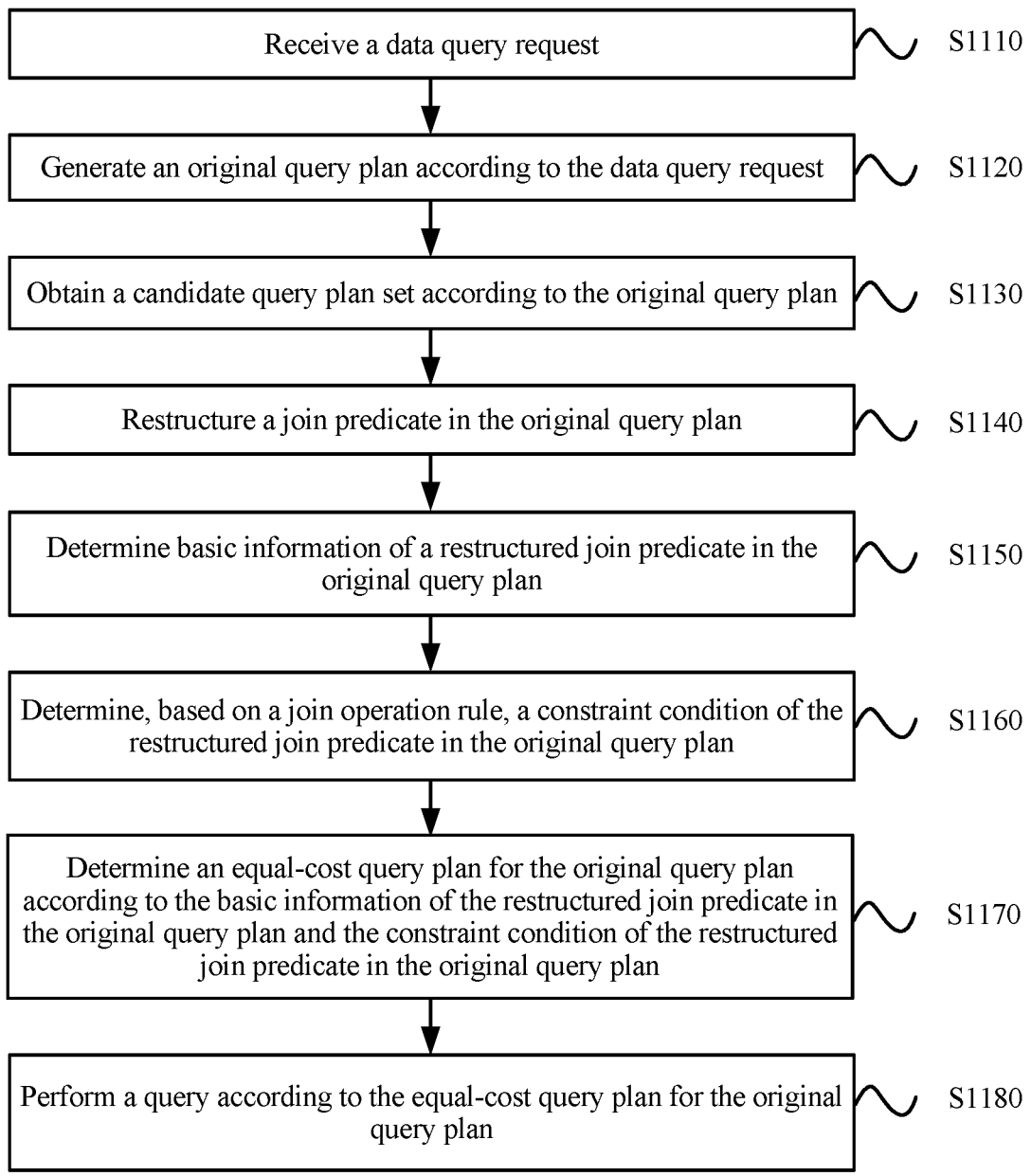
FIG. 11 is a schematic flowchart of a data query method according to an embodiment of the present disclosure.

FIG. 11 shows a schematic flowchart of a data query method 1100 according to an embodiment of the present disclosure. The method 1100 is executed by a database system, and the database system runs on a computer device. Further, the method 1100 is executed by a data query apparatus running on the computer. The data query apparatus may be an apparatus in the database system, such as a query optimizer, or may be the database system.

Step S1110. Receive a data query request.

For example, the data query request may be a data query request input by a user using an SQL language.

Step S1120. Generate an original query plan according to the data query request.

After the data query request is received, the data query request is parsed to obtain the original query plan.

Optionally, step S1130. Obtain a candidate query plan set according to the original query plan.

The candidate query plan set includes all candidate query plans for the original query plan. In this step, a query plan enumeration algorithm may be used to enumerate all the candidate query plans for the original query plan. For example, a typical enumeration algorithm includes a dynamic programming algorithm used in IBM System R.

After all the candidate query plans for the original query plan are enumerated, an equal-cost query plan for the original query plan may be determined from all the candidate query plans.

This step is an optional step. That is, in this embodiment of the present disclosure, the equal-cost query plan or an equal-cost query plan set may be directly obtained from the original query plan using the following step, or an equal-cost query plan set may be obtained from the candidate query plan set using the following step.

Step S1140. Restructure a join predicate in the original query plan.

Further, all join predicates of an inner join operation in the original query plan are transformed into a CNF, and join predicates having a same input table are combined, and all join predicates of a non-inner join operation in the original query plan are combined into one join predicate.

That is, a restructuring manner is traversing each join operation node in the original query plan, and processing is performed according to a join type of the join operation node in the following two cases.

If the join operation is an inner join, all predicates in the join operation are transformed into the CNF, that is, a $p_1 \wedge p_2 \wedge \ldots \wedge p_n$ form, and predicates having a same input table are combined.

If the join operation is not an inner join, all predicates in the join operation are combined into one predicate.

Step S1150. Determine basic information of a restructured join predicate in the original query plan.

In various embodiments of the present disclosure, the basic information of the join predicate includes an input table of the join predicate, an input table of the join predicate that is included in a left subtree of a join operation in which the join predicate is located, an input table of the join predicate that is included in a right subtree of the join operation in which the join predicate is located, and a join type of the join operation in which the join predicate is located.

Further, for a predicate p, basic information of the predicate p includes following.

T(p): an input table included in p;

$T_l(p)$: an input table of p that is included in a left subtree of an operation in which p is located;

$T_r(p)$: an input table of p that is included in a right subtree of the operation in which p is located; and O(p): a join type of the operation in which p is located.

Figure 12:
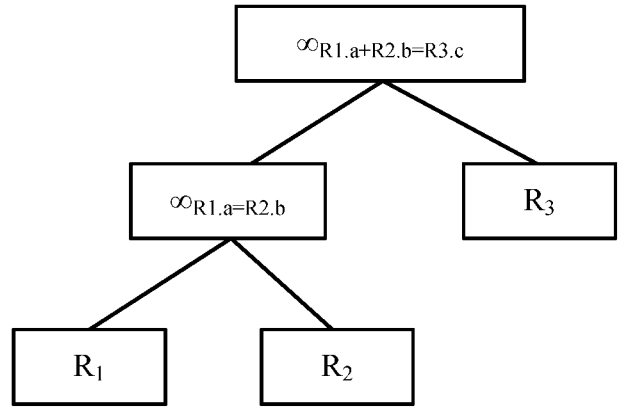
FIG. 12 is an example of a query plan according to an embodiment of the present disclosure.

For example, for a join predicate p={R1.a +R2.b=R3.c} of a root node shown in FIG. 12, basic information of p is as follows.

T(p): {R1, R2, R3};

$T_l(p)$: {R1, R2};

$T_r(p)$: {R3}; and

O(p): an inner join.

Step S1160. Determine, based on a join operation rule, a constraint condition of the restructured join predicate in the original query plan.

Further, for each join operation node $o^B$ in the original query plan, each join operation node $o^A$ in a subtree that uses $o^B$ as a root node is traversed, and when $o^A$ is in a left subtree of the subtree that uses $o^B$ as the root node, if $o^A$ and $o^B$ do not satisfy the operational-level combination rule and the predicate-level combination rule, a first constraint condition is added to each restructured join predicate on $o^B$, and if $o^A$ and $o^B$ do not satisfy the operational-level left-permutation rule and the predicate-level left-permutation rule, a second constraint condition is added to each restructured join predicate on $o^B$, when $o^A$ is in a right subtree of the subtree that uses $o^B$ as the root node, if $o^A$ and $o^B$ do not satisfy the operational-level combination rule and the predicate-level combination rule, a second constraint condition is added to each restructured join predicate on $o^B$, and if $o^A$ and $o^B$ do not satisfy the operational-level right-permutation rule and the predicate-level right-permutation rule, a first constraint condition is added to each restructured join predicate on $o^B$, where the first constraint condition is $T(e_2) \to T(e_1) \cap T(p_{a1} \land p_{a2} \land \ldots \land p_{an})$, the second constraint condition is $T(e_1) \to T(e_2) \cap T(p_{a1} \land p_{a2} \land \ldots \land p_{an})$, $T(e_1)$ indicates an original input table included in a left subtree $e_1$ of a subtree that uses $o^A$ as a root node, $T(e_2)$ indicates an original input table included in a right subtree $e_2$ of the subtree that uses $o^A$ as the root node, $T(p_{a1} \land p_{a2} \land \ldots \land p_{an})$ indicates an original input table included in a restructured join predicate $p_{a1} \land p_{a2} \land \ldots \land p_{an}$ on $o^A$, $T_1 \to T_2$ indicates that if a first subtree that uses a join operation in which a join predicate constrained by $T_1 \to T_2$ is located as a root node includes any input table in $T_1$, the first subtree includes all input tables in $T_2$, and $\cap$ is an intersection set symbol.

Figure 13A:
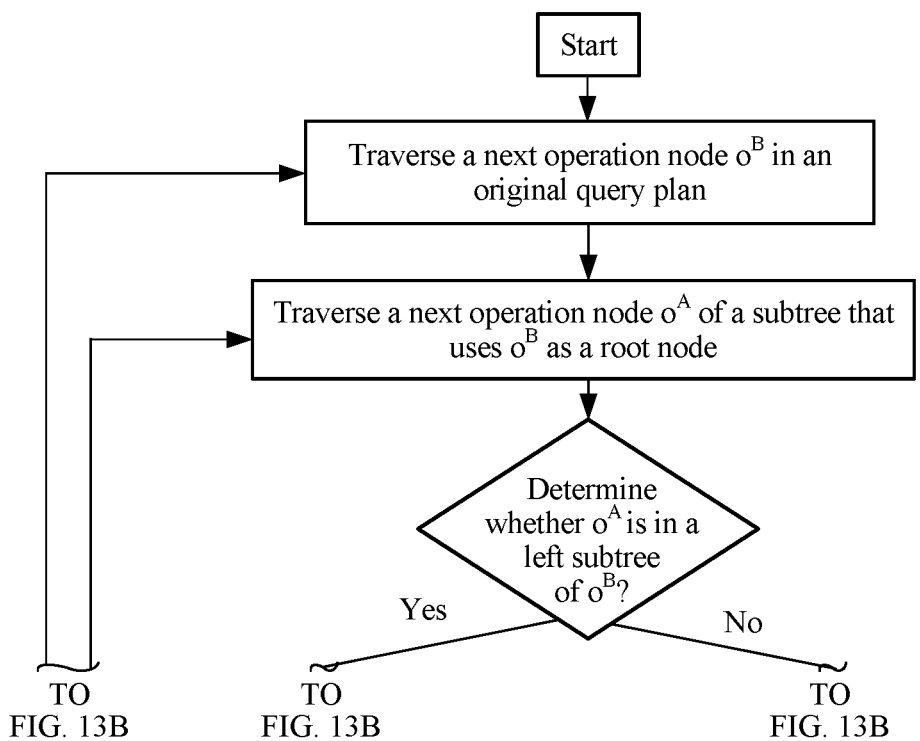
FIG. 13A and FIG. 13B are a flowchart of determining a constraint condition of a predicate in an original query plan according to an embodiment of the present disclosure.
Figure 13B:
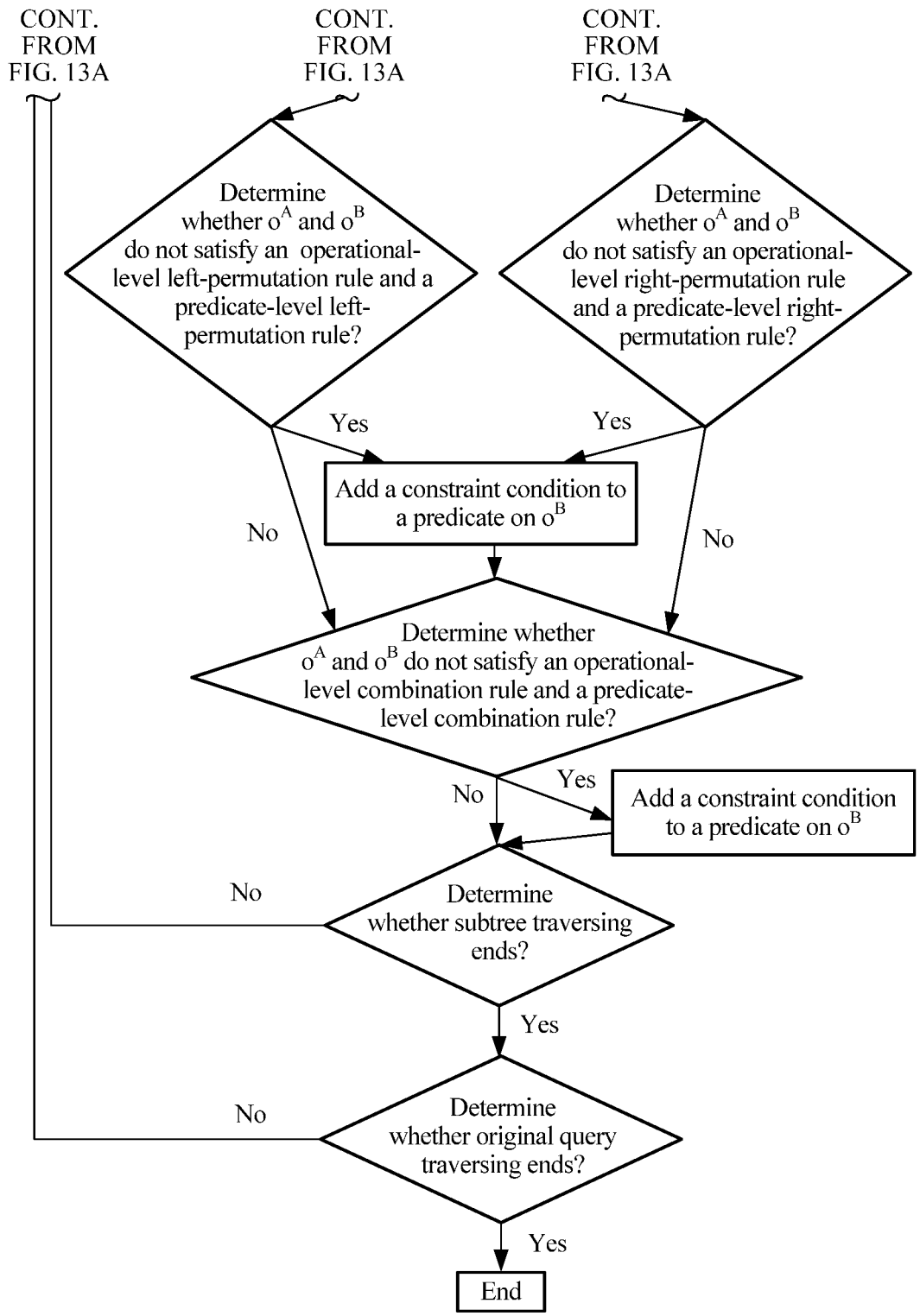

For example, FIG. 13A and FIG. 13B show a flowchart of determining a constraint condition of a predicate in an original query plan. A procedure shown in FIG. 13A and FIG. 13B include two-layer traversal. For an outer layer, each operation node $o^B$ (a restructured predicate on $o^B$ is $p_{b1} \land p_{b2} \land \ldots \land p_{bn}$) in the original query plan is traversed, for an inner layer, each operation node $o^A$ (a restructured predicate on $o^A$ is $p_{a1} \land p_{a2} \land \ldots \land p_{an}$) in a query subtree that uses $o^B$ as a root node is traversed. Then, a constraint condition is added to each predicate on $o^B$ according to a relationship between $o^A$ and $o^B$ in the following two cases.

Figure 14:
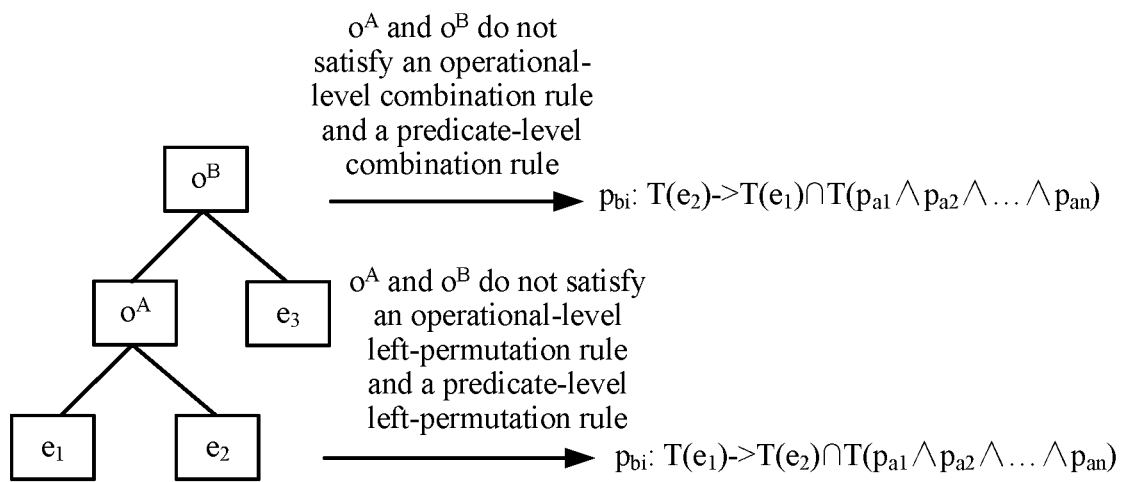
FIG. 14 is a schematic diagram of adding a constraint condition according to an embodiment of the present disclosure.

If $o^A$ is in a left subtree of $o^B$, a constraint condition is added to each predicate $p_b$, on $o^B$ according to a method shown in FIG. 14.

Figure 15:
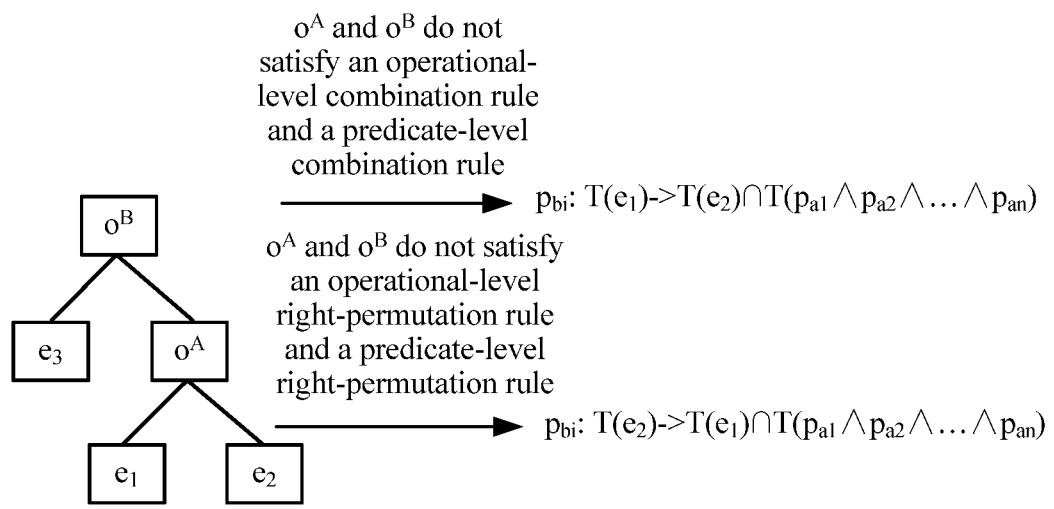
FIG. 15 is another schematic diagram of adding a constraint condition according to an embodiment of the present disclosure.

If $o^A$ is in a right subtree of $o^B$, a constraint condition is added to each predicate $p_b$, on $o^B$ according to a method shown in FIG. 15.

Step S1170. Determine an equal-cost query plan for the original query plan according to the basic information of the restructured join predicate in the original query plan and the constraint condition of the restructured join predicate in the original query plan.

Optionally, an equal-cost query plan set for the original query plan may be determined according to the basic information of the restructured join predicate in the original query plan and the constraint condition of the restructured join predicate in the original query plan. A query plan in the equal-cost query plan set is the equal-cost query plan for the original query plan.

In this step, optionally, if the candidate query plan set for the original query plan is obtained in an enumeration manner, the equal-cost query plan set may be determined from the candidate query plan set, that is, whether each candidate query plan is an equal-cost query plan for the original query plan is determined. If there is no candidate query plan set, a candidate query plan may be obtained from the original query plan each time, and whether the candidate query plan is an equal-cost query plan for the original query plan is determined.

Further, it is determined that a first candidate query plan P' is an equal-cost query plan for the original query plan P if P' satisfies the following conditions, where a join type of each first join operation of P' is an inner join, the first join operation is a join operation having at least two restructured join predicates, and a join type of a join operation that is in P and that is corresponding to each join predicate in the at least two restructured join predicates is an inner join (this condition may be referred to as join type consistency), for each join predicate p on each join operation $o^{b'}$ in P', when $o^{b'}$ does not satisfy the operational-level exchange rule, $T_{l(p)}$ in P' and $T_{l(p)}$ in P are equal, and $T_{r(p)}$ in P' and $T_{r(p)}$ in P are equal, where $T_{l(p)}$ indicates an input table of p included in a left subtree of a join operation in which p is located, and $T_{r(p)}$ indicates an input table of p included in a right subtree of the join operation in which p is located, when $o^{b'}$ satisfies the operational-level exchange rule, $T_{l(p)}$ in P' and $T_{l(p)}$ in P are equal, and $T_{r(p)}$ in P' and $T_{r(p)}$ in P are equal, or $T_{l(p)}$ in P' and $T_{r(p)}$ in P are equal, and $T_{r(p)}$ in P' and $T_{l(p)}$ in P are equal (this condition may be referred to as input table information consistency), and for each join predicate p on each join operation $o^{b'}$ in P', p satisfies a constraint condition for p in P (this condition may be referred to as constraint condition consistency), and if the candidate query plan set for the original query plan is obtained previously, the first candidate query plan P' herein may be any candidate query plan in the candidate query plan set.

All equal-cost query plans for the original query plan can be obtained in the foregoing manner. That is, the equal-cost query plan set obtained in this embodiment of the present disclosure is the most complete.

Step S1180. Perform querying according to the equal-cost query plan for the original query plan.

Optionally, a query plan may be selected from the equal-cost query plan set to perform querying. That is, the query plan is selected from the foregoing obtained equal-cost query plan set to perform querying. Further, a query plan with minimum costs may be selected from the equal-cost query plan set to perform querying, and a query result is returned.

Because the equal-cost query plan set in this embodiment of the present disclosure includes all the equal-cost query plans for the original query plan, an optimal query plan can be selected in this embodiment of the present disclosure. Considering that different query plans differ in performance by dozens or even hundreds of times, data query performance can be significantly improved using the method in this embodiment of the present disclosure.

Therefore, according to the data query method in this embodiment of the present disclosure, the equal-cost query plan for the original query plan is determined according to the basic information of the predicate and the constraint condition obtained based on the join operation rule, and all the equal-cost query plans for the original query plan can be obtained such that data query performance can be improved.

The equal-cost query plan set in this embodiment of the present disclosure includes all query plans that can be obtained from the original query plan by means of transformation using at least one of four operational-level rules and three predicate-level rules. The method for determining the equal-cost query plan for the original query plan is given in the foregoing steps S1140 to S1170. The following describes the method for determining the equal-cost query plan for the original query plan in detail with reference to a specific example. It should be noted that this is merely intended to help a person skilled in the art better understand this embodiment of the present disclosure, but is not intended to limit the scope of this embodiment of the present disclosure.

Figure 16:
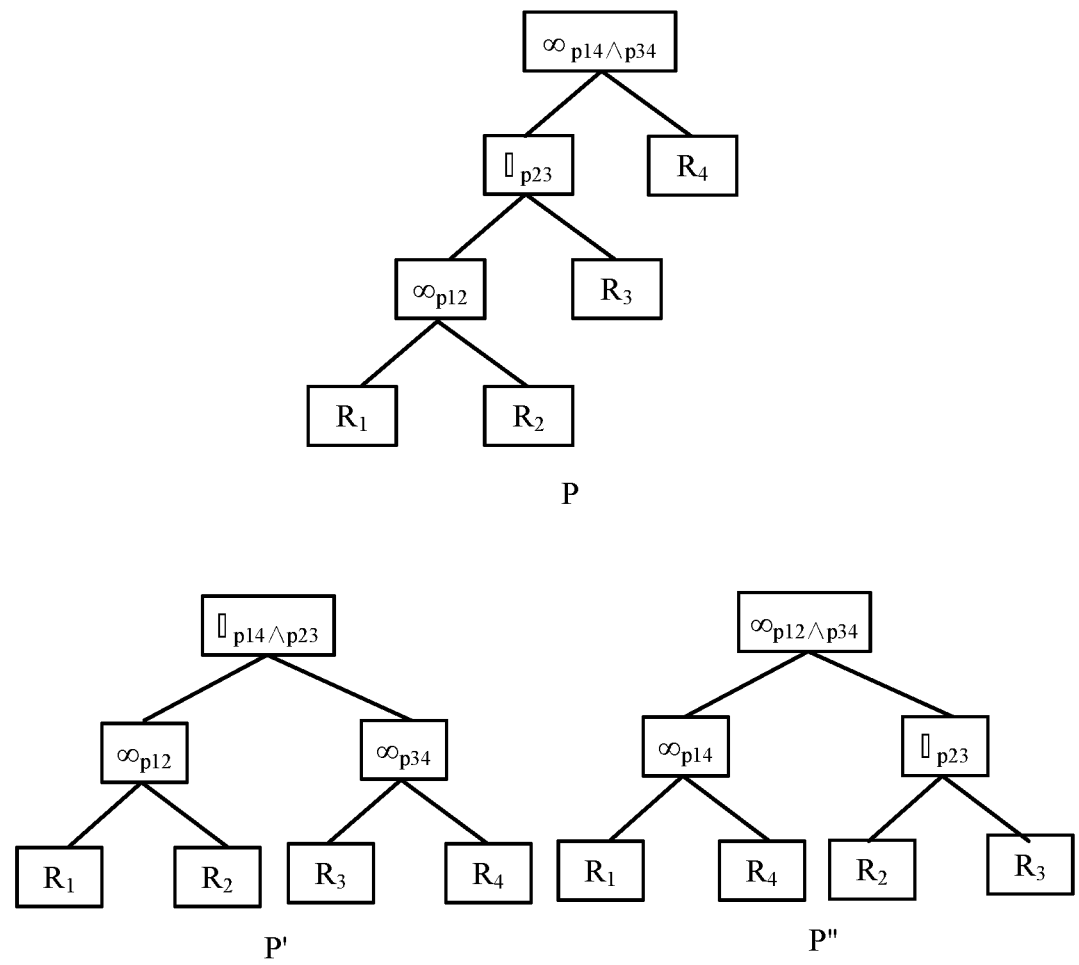
FIG. 16 is an example of determining an equal-cost query plan according to an embodiment of the present disclosure.

FIG. 16 shows three query plans P, P', and P'''. ∞ represents an inner join operation, ▷ represents a left anti-join, P is an original query plan, and P' and P''' are candidate query plans. Whether the candidate query plans P' and P''' are equivalent to the original query plan P may be determined in the following manner.

1. Join predicates in the original query plan P are restructured, and basic information of restructured join predicates are determined, where P includes three join operations (that is, $\infty_{p14 \wedge p34}$, $\triangleright_{p23}$, and $\infty_{p12}$) in total. For the join operation $\infty_{p14 \wedge p34}$, because the join operation is an inner join, predicates of the join operation need to be transformed into a CNF (a CNF of p14∧p34 is p14∧p34). Because input tables of p14 and p34 are different, p14 and p34 cannot be combined into one predicate. For a join operation $\triangleright_{p23}$, because the join operation is not an inner join, a predicate (that is, p23) of the join operation is considered as one predicate. Similarly, a predicate of a join operation $\infty_{p12}$ is still p12 after being restructured. After the predicates are restructured, the basic information of the restructured predicates is determined. Table 7 lists the basic information of the restructured predicates in P.

TABLE 7

| P | T(p) | $T_l(p)$ | $T_r(p)$ | O(p) |
|---|---|---|---|---|
| p14 | {$R_1$, $R_4$} | {$R_1$} | {$R_4$} | Inner join |
| p34 | {$R_3$, $R_4$} | {$R_3$} | {$R_4$} | Inner join |
| p23 | {$R_2$, $R_3$} | {$R_2$} | {$R_3$} | Left anti-join |
| p12 | {$R_1$, $R_2$} | {$R_1$} | {$R_2$} | Inner join |

2. Constraint conditions of the restructured join predicates are determined The operation $\infty_{p14 \wedge p34}$ has two descendant operations (that is, $\infty_{p12}$ and $\triangleright_{p23}$), and therefore whether the two descendant operations and the operation satisfy a corresponding rule needs to be determined to obtain constraint conditions of the predicates p14 and p34. The descendant operation $\infty_{p12}$ and the operation $\infty_{p14 \wedge p34}$ satisfy an operational-level combination rule and a predicate-level combination rule, and further satisfy an operational-level left-permutation rule and a predicate-level left-permutation rule, and therefore no constraint rule needs to be added. The descendant operation $\triangleright_{p23}$ and the operation $\infty_{p14 \wedge p34}$ do not satisfy the operational-level combination rule and the predicate-level combination rule, and therefore a rule $R_3 \rightarrow R_2$ needs to be added to p14 and p34. In addition, $\triangleright_{p23}$ and the operation $\infty_{p14 \wedge p34}$ do not satisfy the predicate-level left-permutation rule, but satisfy the operational-level left-permutation rule, and therefore no constraint rule needs to be further added. Similarly, constraint conditions of predicates of the operations $\infty_{o2}$ and $\triangleright_{p23}$ and descendant operations of the operations $\infty_{o2}$ and $\triangleright_{p23}$ may be obtained by determining whether the operations $\infty_{o2}$ and $\triangleright_{p23}$ and the descendant operations of the operations $\infty_{p12}$ and $\triangleright_{p23}$ satisfy a corresponding rule. Table 8 lists the constraint conditions of the restructured predicates in the original query plan P.

TABLE 8

| P | Constraint condition |
|---|---|
| p14 | $R_3 \rightarrow R_2$ |
| p34 | $R_3 \rightarrow R_2$ |
| p23 | None |
| p12 | None |

3. An equal-cost query plan is determined according to the basic information and the constraint conditions of the predicates. The candidate query plan P' is not equivalent to the original query plan P because P' violates join type consistency (an operation for a root node of P' includes two predicates, but an operation type of the node is not an inner join, and a join type of an operation that is in P and that is corresponding to p23 is not an inner join either). The candidate query plan P''' satisfies join type consistency (an operation $\infty_{p12 \wedge p34}$ in P''' is an inner join, and operations in the original query P that are corresponding to p12 and p34 are also inner joins), input table information consistency (input table information of a predicate in P''' and input table information of the predicate in the table are consistent), and constraint condition consistency (the predicate in P''' satisfies the constraint condition shown in the table), and therefore P''' is equivalent to the original query plan P.

According to the method for determining the equal-cost query plan in this embodiment of the present disclosure, all the equal-cost query plans for the original query plan can be obtained, and data query performance can be improved.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The foregoing has described in detail the data query method according to an embodiment of the present disclosure. The following describes a data query apparatus and a database system according to an embodiment of the present disclosure. The data query apparatus and the database system can execute the data query method in the foregoing embodiment of the present disclosure.

Figure 17:
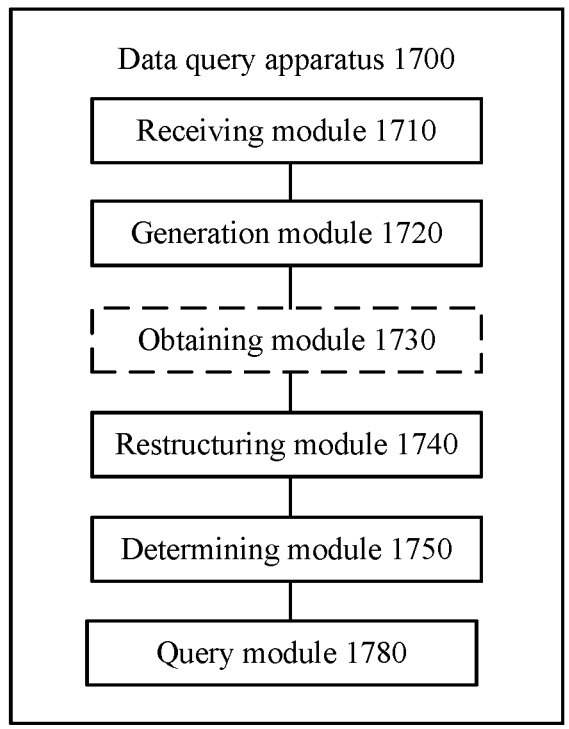
FIG. 17 is a schematic block diagram of a data query apparatus according to an embodiment of the present disclosure.

FIG. 17 shows a schematic block diagram of a data query apparatus 1700 according to an embodiment of the present disclosure. The data query apparatus 1700 may be an apparatus in a database system, for example, a query optimizer. As shown in FIG. 17, the data query apparatus 1700 includes a receiving module 1710 configured to receive a data query request, a generation module 1720 configured to generate an original query plan according to the data query request, a restructuring module 1740 configured to restructure a join predicate in the original query plan, a determining module 1750 configured to determine basic information of a restructured join predicate in the original query plan, determine, based on a join operation rule, a constraint condition of the restructured join predicate in the original query plan, and determine an equal-cost query plan for the original query plan according to the basic information of the restructured join predicate in the original query plan and the constraint condition of the restructured join predicate in the original query plan, and a query module 1780 configured to perform querying according to the equal-cost query plan for the original query plan.

According to the data query apparatus 1700 in this embodiment of the present disclosure, the equal-cost query plan for the original query plan is determined according to the basic information of the predicate and the constraint condition obtained based on the join operation rule, and all equal-cost query plans for the original query plan can be obtained such that data query performance can be improved.

Optionally, in an embodiment of the present disclosure, the determining module 1750 is further configured to determine an equal-cost query plan set for the original query plan according to the basic information of the restructured join predicate in the original query plan and the constraint condition of the restructured join predicate in the original query plan, and the query module 1780 is further configured to select a query plan from the equal-cost query plan set to perform querying.

Optionally, in an embodiment of the present disclosure, the data query apparatus 1700 may further include an obtaining module 1730 configured to obtain a candidate query plan set according to the original query plan, where in this case, the determining module 1750 is further configured to determine the equal-cost query plan set from the candidate query plan set according to the basic information of the restructured join predicate in the original query plan and the constraint condition of the restructured join predicate in the original query plan.

Optionally, in an embodiment of the present disclosure, the restructuring module 1740 is further configured to transform all join predicates of an inner join operation in the original query plan into a CNF, combine join predicates having a same input table, and combine all join predicates of a non-inner join operation in the original query plan into one join predicate.

Optionally, in an embodiment of the present disclosure, the basic information of the join predicate includes an input table of the join predicate, an input table of the join predicate that is included in a left subtree of a join operation in which the join predicate is located, an input table of the join predicate that is included in a right subtree of the join operation in which the join predicate is located, and a join type of the join operation in which the join predicate is located.

Optionally, in an embodiment of the present disclosure, the join operation rule includes an operational-level rule and a predicate-level rule, where the operational-level rule includes an operational-level exchange rule $e_1 \; o^a_{p12} \; e_2 = e_2 \; o^a_{p12} \; e_1$, an operational-level combination rule $(e_1 \; o^a_{p12} \; e_2) \; o^b_{p23} \; e_3 = e_1 \; o^a_{p12} \; (e_2 \; o^b_{p23} \; e_3)$, an operational-level left-permutation rule $(e_1 \; o^a_{p12} \; e_2) \; o^b_{p13} \; e_3 = (e_1 \; o^b_{p13} \; e_3) \; o^a_{p12} \; e_2$, and an operational-level right-permutation rule $e_1 \; o^a_{p13} \; (e_2 \; o^b_{p23} \; e_3) = e_2 \; o^b_{p23} \; o^a_{p13} \; e_3)$, the predicate-level rule includes a predicate-level combination rule $(e_1 \; o^a_{p12} \; e_2) \; o^b_{p \wedge p23} \; e_3 = e_1 \; o^a_{p12 \wedge p} \; (e_2 \; o^b_{p23} \; e_3)$, a predicate-level left-permutation rule $(e_1 \; o^a_{p12} \; e_2) \; o^b_{p13 \wedge p} \; e_3 = (e_1 \; o^b_{p13} \; e_3) \; o^a_{p12 \wedge p} \; e_2$, and a predicate-level right-permutation rule $e_1 \; o^a_{p \wedge p13} \; (e_2 \; o^b_{p23} \; e_3) = e_2 \; o^b_{p \wedge p23} \; (e_1 \; o^a_{p13})$, $e_i$ is a query expression, $o^a$ and $o^b$ are join operations, and pij is a join predicate between $e_i$ and $e_j$.

Optionally, in an embodiment of the present disclosure, the determining module 1750 is further configured to traverse, for each join operation node $o^B$ in the original query plan, each join operation node $o^A$ in a subtree that uses $o^B$ as a root node, and when $o^A$ is in a left subtree of the subtree that uses $o^B$ as the root node, if $o^A$ and $o^B$ do not satisfy the operational-level combination rule and the predicate-level combination rule, add a first constraint condition to each restructured join predicate on $o^B$, and if $o^A$ and $o^B$ do not satisfy the operational-level left-permutation rule and the predicate-level left-permutation rule, add a second constraint condition to each restructured join predicate on $o^B$, when $o^A$ is in a right subtree of the subtree that uses $o^B$ as the root node, if $o^A$ and $o^B$ do not satisfy the operational-level combination rule and the predicate-level combination rule, add a second constraint condition to each restructured join predicate on $o^B$, and if $o^A$ and $o^B$ do not satisfy the operational-level right-permutation rule and the predicate-level right-permutation rule, add a first constraint condition to each restructured join predicate on $o^B$, where the first constraint condition is $T(e_2) \rightarrow T(e_1) \cap T(p_{a1} \wedge p_{a2} \wedge \ldots \wedge p_a)$, the second constraint condition is $T(e_1) \rightarrow T(e_2) \cap T(p_{a1} \wedge p_{a2} \wedge \ldots \wedge p_a)$, $T(e_1)$ indicates an original input table included in a left subtree $e_1$ of a subtree that uses $o^A$ as a root node, $T(e_2)$ indicates an original input table included in a right subtree $e_2$ of the subtree that uses $o^A$ as the root node, $T(p_{a1} \wedge p_{a2} \wedge \ldots \wedge p_{an})$ indicates an original input table included in a restructured join predicate $p_{a1} \wedge p_{a2} \wedge \ldots \wedge p_{an}$ on $o^A$, and $T_1 \rightarrow T_2$ indicates that if a first subtree that uses a join operation in which a join predicate constrained by $T_1 \rightarrow T_2$ is located as a root node includes any input table in $T_1$, the first subtree includes all input tables in $T_2$.

Optionally, in an embodiment of the present disclosure, the determining module 1750 is further configured to determine that a first candidate query plan P' is an equal-cost query plan for the original query plan P if P' satisfies the following conditions a join type of each first join operation of P' is an inner join, the first join operation is a join operation having at least two restructured join predicates, and a join type of a join operation that is in P and that is corresponding to each join predicate in the at least two restructured join predicates is an inner join, for each join predicate p on each join operation $o^{b'}$ in P', when $o^{b'}$ does not satisfy the operational-level exchange rule, $T_l(p)$ in P' and $T_l(p)$ in P are equal, and $T_r(p)$ in P' and $T_r(p)$ in P are equal, where $T_l(p)$ indicates an input table of p included in a left subtree of a join operation in which p is located, and $T_r(p)$ indicates an input table of p included in a right subtree of the join operation in which p is located, when $o^{b'}$ satisfies the operational-level exchange rule, $T_l(p)$ in P' and $T_l(p)$ in P are equal, and $T_r(p)$ in P' and $T_r(p)$ in P are equal, or $T_l(p)$ in P' and $T_r(p)$ in P are equal, and $T_r(p)$ in P' and $T_l(p)$ in P are equal, and for each join predicate p on each join operation $o^{b'}$ in P', p satisfies a constraint condition for p in P.

Optionally, in an embodiment of the present disclosure, the query module 1780 is further configured to select a query plan with minimum costs from the equal-cost query plan set to perform querying.

The data query apparatus 1700 according to this embodiment of the present disclosure may be corresponding to an execution body of the data query method according to the embodiments of the present disclosure, and the foregoing and other operations and/or functions of the modules in the data query apparatus 1700 are respectively used to implement corresponding procedures of the foregoing methods. For brevity, details are not described herein again.

Figure 18:
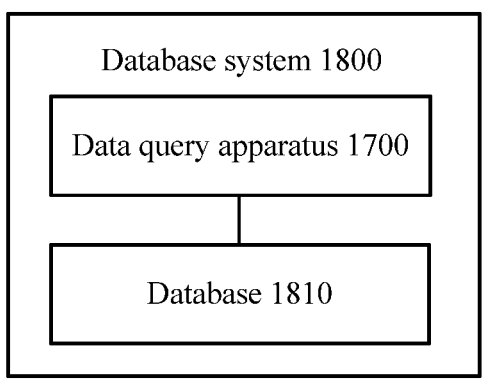
FIG. 18 is a schematic block diagram of a database system according to an embodiment of the present disclosure.

FIG. 18 shows a schematic block diagram of a database system 1800 according to an embodiment of the present disclosure. As shown in FIG. 18, the database system 1800 includes the foregoing data query apparatus 1700 according to the embodiments of the present disclosure and a database 1810. The database system 1800 may execute the data query method according to the embodiments of the present disclosure, and performs querying in the database 1810.

Figure 19:
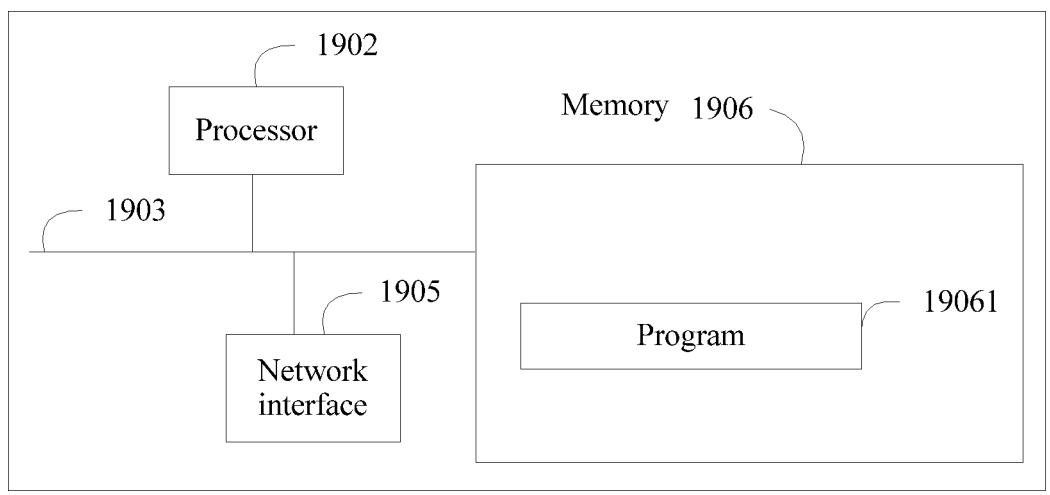
FIG. 19 is a schematic structural diagram of a data query apparatus according to an embodiment of the present disclosure.

FIG. 19 shows a structure of a data query apparatus according to another embodiment of the present disclosure.

The apparatus includes at least one processor 1902 (for example, a central processing unit (CPU)), at least one network interface 1905 or another communications interface, a memory 1906, and at least one communications bus 1903 that is configured to implement connection and communication between these apparatuses. The processor 1902 is configured to execute an executable module stored in the memory 1906, such as a computer program. The memory 1906 may include a high-speed random access memory (RAM), and may further include a non-volatile memory such as at least one magnetic disk memory. A communication connection with at least one other network element is implemented using the at least one network interface 1905 (which may be wired or wireless).

In some implementations, the memory 1906 stores a program 19061, and the processor 1902 executes the program 19061 to execute the data query method according to the foregoing embodiment of the present disclosure.

It should be understood that, the term "and/or" in this embodiment of the present disclosure describes only an association relationship for describing associated objects and represents that three relationships may exist. For example, A and/or B may represent the following three cases, where only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data query method, executed by a database management system managing a database, comprising:
   receiving a data query request from a client, wherein the database management system and the database run on a computer device, and wherein the computer device is coupled with the client by a network;
   generating an original query plan according to the data query request;
   restructuring a join predicate in the original query plan by:
      transforming all join predicates of an inner join operation in the original query plan into a conjunctive form;
      combining join predicates having a same input table; and
      combining all join predicates of a non-inner join operation in the original query plan into the join predicate;
   determining basic information of a restructured join predicate in the original query plan;
   determining, based on a join operation rule, a constraint condition of the restructured join predicate in the original query plan;
   determining an equal-cost query plan for the original query plan according to the basic information of the restructured join predicate in the original query plan and the constraint condition of the restructured join predicate in the original query plan;
   performing querying in the database, according to the equal-cost query plan for the original query plan, to generate a querying result; and
   sending the querying result to the client.

2. The data query method of claim 1, wherein determining the equal-cost query plan for the original query plan comprises:
   determining an equal-cost query plan set for the original query plan according to the basic information of the restructured join predicate in the original query plan and the constraint condition of the restructured join predicate in the original query plan; and
   performing querying in the database by selecting a query plan from the equal-cost query plan set to perform the querying.

3. The data query method of claim 2, further comprising:
   obtaining a candidate query plan set according to the original query plan; and
   determining the equal-cost query plan set for the original query plan by determining the equal-cost query plan set from the candidate query plan set according to the basic information of the restructured join predicate in the original query plan and the constraint condition of the restructured join predicate in the original query plan.

4. The data query method of claim 1, wherein the basic information of the restructured join predicate comprises an input table of the restructured join predicate, an input table of the restructured join predicate comprised in a left subtree of a join operation in which the restructured join predicate is located, an input table of the restructured join predicate comprised in a right subtree of the join operation in which the restructured join predicate is located, and a join type of the join operation in which the restructured join predicate is located.

5. The data query method of claim 1, wherein the join operation rule comprises an operational-level rule and a predicate-level rule, wherein the operational-level rule comprises an operational-level exchange rule of $e_1 \, o^a_{p12} \, e_2 = e_2 \, o^a_{p12} \, e_1$, an operational-level combination rule of $(e_1 \, o^a_{p12} \, e_2) \, o^b_{p23} \, e_3 = e_1 \, o^a_{p12} \, (e_2 \, o^b_{p23} \, e_3)$, an operational-level left-permutation rule of $(e_1 \, o^a_{p12} \, e_2) \, o^b_{p13} \, e_3 = (e_1 \, o^b_{p13} \, e_3) \, o^a_{p12} \, e_2$, and an operational-level right-permutation rule of $e_1 \, o^a_{p13} \, (e_2 \, o^b_{p23} \, e_3) = e_2 \, o^b_{p23} \, (e_1 \, o^a_{p13} \, e_3)$, wherein the predicate-level rule comprises a predicate-level combination rule of $(e_1 \, o^a_{p12} \, e_2) \, o^b_{p \wedge p23} \, e_3 = e_1 \, o^a_{p12 \wedge p} \, (e_2 \, o^b_{p23} \, e_3)$, a predicate-level left-permutation rule of $(e_1 \, o^a_{p12} \, e_2)^b_{p13 \wedge p} \, e_3 = (e_1 \, o^b_{p13} \, e_3) \, o^a_{p12 \wedge p} \, e_2$, a predicate-level right-permutation rule of $e_1 \, o^a_{p \wedge p13} \, (e_2 \, o^b_{p23} \, e_3) = e_2 \, o^b_{p \wedge p23} \, (e_1 \, o^a_{p13} \, e_3)$, wherein $e_i$ comprises a query expression, wherein the $o^a$ and the $o^b$ are join operations, and wherein pij comprises a join predicate between $e_i$ and $e_j$.

6. The data query method of claim 5, wherein determining the constraint condition of the restructured join predicate in the original query plan comprises:
   traversing, for each join operation node in the original query plan ($o^B$), each join operation node in a subtree that uses the $o^B$ as a root node ($o^A$);
   determining the $o^A$ is in a left subtree of the subtree using the $o^B$ as the root node;
   determining the $o^A$ and the $o^B$ do not satisfy the operational-level combination rule and the predicate-level combination rule; and
   adding a first constraint condition to each restructured join predicate on the $o^B$, wherein the first constraint condition comprises $T(e_2) \rightarrow T(e_1) \cap T(p_{a1} \wedge p_{a2} \wedge \ldots \wedge p_{an})$, wherein the $T(e_1)$ indicates an original input table comprised in a left subtree of a subtree that uses the $o^A$ as the root node ($e_1$), wherein the $T(e_2)$ indicates an original input table comprised in a right subtree of the subtree that uses $o^A$ as the root node ($e_2$), wherein the $T(p_{a1} \wedge p_{a2} \wedge \ldots \wedge p_{an})$ indicates an original input table comprised in a restructured join predicate $p_{a1} \wedge p_{a2} \wedge \ldots \wedge p_{an}$ on the $o^A$, and wherein the $T_1 \rightarrow T_2$ indicates that when a first subtree that uses a join operation in which a join predicate constrained by the $T_1 \rightarrow T_2$ is located as the root node comprises any input table in $T_1$, the first subtree comprises all input tables in $T_2$.

7. The data query method of claim 5, wherein determining the constraint condition of the restructured join predicate in the original query plan comprises:
   traversing, for each join operation node in the original query plan ($o^B$), each join operation node in a subtree that uses the $o^B$ as a root node ($o^A$);
   determining the $o^A$ is in a left subtree of the subtree that uses the $o^B$ as the root node;
   determining the $o^A$ and the $o^B$ do not satisfy the operational-level left-permutation rule and the predicate-level left-permutation rule; and
   adding a second constraint condition to each restructured join predicate on the $o^B$, wherein the second constraint condition comprises $T(e_1) \rightarrow T(e_2) \cap T(p_{a1} \wedge p_{a2} \wedge \ldots \wedge p_{an})$, wherein the $T(e_1)$ indicates an original input table comprised in a left subtree of a subtree that uses the $o^A$ as the root node ($e_1$), wherein the $T(e_2)$ indicates an original input table comprised in a right subtree of the subtree that uses the $o^A$ as the root node ($e_2$), wherein the $T(p_{a1} \wedge p_{a2} \wedge \ldots \wedge p_{an})$ indicates an original input table comprised in a restructured join predicate $p_{a1} \wedge p_{a2} \wedge \ldots \wedge p_{an}$ on the $o^A$, and wherein the $T_1 \rightarrow T_2$ indicates that when a first subtree that uses a join operation in which a join predicate constrained by the $T_1 \rightarrow T_2$ is located as the root node comprises any input table in $T_1$, the first subtree comprises all input tables in $T_2$.

8. The data query method of claim 5, wherein determining the constraint condition of the restructured join predicate in the original query plan comprises:
   traversing, for each join operation node in the original query plan ($o^B$), each join operation node in a subtree that uses the $o^B$ as a root node ($o^A$);
   determining the $o^A$ is in a right subtree of the subtree that uses the $o^B$ as the root node;
   determining the $o^A$ and the $o^B$ do not satisfy the operational-level combination rule and the predicate-level combination rule; and
   adding a second constraint condition to each restructured join predicate on the $o^B$, wherein the second constraint condition comprises $T(e_1) \rightarrow T(e_2) \cap T(p_{a1} \wedge p_{a2} \wedge \ldots \wedge p_{an})$, wherein the $T(e_1)$ indicates an original input table comprised in a left subtree of a subtree that uses the $o^A$ as the root ($e_1$), wherein the $T(e_2)$ indicates an original input table comprised in a right subtree of the subtree that uses the $o^A$ as the root node ($e_2$), wherein the $T(p_{a1} \wedge p_{a2} \wedge \ldots \wedge p_{an})$ indicates an original input table comprised in a restructured join predicate $p_{a1} \wedge p_{a2} \wedge \ldots \wedge p_{an}$ on the $o^A$, and wherein the $T_1 \rightarrow T_2$ indicates that when a first subtree that uses a join operation in which a join predicate constrained by the $T_1 \rightarrow T_2$ is located as the root node comprises any input table in $T_1$, the first subtree comprises all input tables in $T_2$.

9. The data query method of claim 5, wherein determining the constraint condition of the restructured join predicate in the original query plan comprises:
   traversing, for each join operation node in the original query plan ($o^B$), each join operation node in a subtree that uses the $o^B$ as a root node ($o^A$);

determining the $o^A$ is in a right subtree of the subtree that uses the $o^B$ as the root node;

determining the $o^A$ and the $o^B$ do not satisfy the operational-level right-permutation rule and the predicate-level right-permutation rule; and adding a first constraint condition to each restructured join predicate on the $o^B$, wherein the first constraint condition comprises $T(e_2) \to T(e_1) \cap T(p_{a1} \wedge p_{a2} \wedge \ldots \wedge p_{an})$, wherein the $T(e_1)$ indicates an original input table comprised in a left subtree of a subtree that uses the $o^A$ as the root node ($e_1$), wherein the $T(e_2)$ indicates an original input table comprised in a right subtree of the subtree that uses the $o^A$ as the root node ($e_2$), wherein the $T(p_{a1} \wedge p_{a2} \wedge \ldots \wedge p_{an})$ indicates an original input table comprised in a restructured join predicate $p_{a1} \wedge p_{a2} \wedge \ldots \wedge p_{an}$ on the $o^A$, and wherein the $T_1 \to T_2$ indicates that when a first subtree that uses a join operation in which a join predicate constrained by the $T_1 \to T_2$ is located as the root node comprises any input table in $T_1$, the first subtree comprises all input tables in $T_2$.

10. The data query method of claim 1, wherein determining the equal-cost query plan for the original query plan comprises:

determining that a first candidate query plan (P') comprises the equal-cost query plan for the original query plan when the P' satisfies the following conditions of:

a join type of each first join operation of the P' comprises an inner join, wherein a first join operation has at least two restructured join predicates, and wherein a join type of a join operation in the original query plan corresponding to each join predicate in the at least two restructured join predicates comprises another inner join;

for each join predicate on each join operation ($o^{b'}$) in the P', when the $o^{b'}$ does not satisfy an operational-level exchange rule, $T_l(p)$ in the P' and $T_l(p)$ in the original query plan are equal, and $T_r(p)$ in the P' and $T_r(p)$ in the original query plan are equal, wherein p indicates join predicate, wherein the $T_l(p)$ indicates an input table of a p comprised in a left subtree of a join operation in which the p is located, and wherein the $T_r(p)$ indicates an input table of another p comprised in a right subtree of the join operation in which the other p is located; and the p satisfying a constraint condition for a p in the original query plan for each p on each $o^{b'}$ in the P'.

11. The data query method of claim 1, wherein determining the equal-cost query plan for the original query plan comprises:

determining that a first candidate query plan (P') comprises the equal-cost query plan for the original query plan when the P' satisfies the following conditions of:

a join type of each first join operation of the P' comprises an inner join, wherein a first join operation has at least two restructured join predicates, and wherein a join type of a join operation in the original query plan corresponding to each join predicate in the at least two restructured join predicates comprises another inner join;

for each join predicate (p) on each join operation ($o^{b'}$) in the P', when the $o^{b'}$ satisfying an operational-level exchange rule, either:

$T_l(p)$ in the P' and $T_l(p)$ in the original query plan are equal, and $T_r(p)$ in the P' and $T_r(p)$ in the original query plan are equal; or the $T_l(p)$ in the P' and the $T_r(p)$ in the original query plan are equal, and the $T_r(p)$ in the P' and the $T_l(p)$ in the original query plan are equal; and the p satisfying a constraint condition for a p in the original query plan for each p on each $o^{b'}$ in the P'.

12. The data query method of claim 2, wherein selecting the query plan from the equal-cost query plan set to perform the querying comprises selecting a query plan with minimum costs from the equal-cost query plan set to perform the querying.

13. A data query apparatus, coupled with a client by a network, the data query apparatus comprising:

a memory storing a plurality of instructions; and a processor coupled to the memory, wherein the instructions cause the processor to be configured to:

receive a data query request from the client;

generate an original query plan according to the data query request;

restructure a join predicate in the original query plan by:

transforming all join predicates of an inner join operation in the original query plan into a conjunctive form;

combining join predicates having a same input table; and combining all join predicates of a non-inner join operation in the original query plan into the join predicate;

determine basic information of a restructured join predicate in the original query plan;

determine, based on a join operation rule, a constraint condition of the restructured join predicate in the original query plan;

determine an equal-cost query plan for the original query plan according to the basic information of the restructured join predicate in the original query plan and the constraint condition of the restructured join predicate in the original query plan;

perform querying in a database, according to the equal-cost query plan for the original query plan, to generate a querying result; and send the querying result to the client.

14. The data query apparatus of claim 13, wherein the instructions further cause the processor to be configured to:

determine an equal-cost query plan set for the original query plan according to the basic information of the restructured join predicate in the original query plan and the constraint condition of the restructured join predicate in the original query plan; and select a query plan from the equal-cost query plan set to perform the querying.

15. The data query apparatus of claim 14, wherein the instructions further cause the processor to be configured to:

obtain a candidate query plan set according to the original query plan; and determine the equal-cost query plan set from the candidate query plan set according to the basic information of the restructured join predicate in the original query plan and the constraint condition of the restructured join predicate in the original query plan.

16. The data query apparatus of claim 15, wherein the basic information of the restructured join predicate comprises an input table of the restructured join predicate, an input table of the restructured join predicate comprised in a left subtree of a join operation in which the restructured join predicate is located, an input table of the restructured join predicate comprised in a right subtree of the join operation in which the restructured join predicate is located, and a join type of the join operation in which the restructured join predicate is located.

17. The data query apparatus of claim 16, wherein the join operation rule comprises an operational-level rule and a predicate-level rule, wherein the operational-level rule comprises an operational-level exchange rule of $e_1 \; o^a_{p12} \; e_2 = e_2 \; o^a_{p12} \; e_1$, an operational-level combination rule of $(e_1 \; o^a_{p12} \; e_2) \; o^b_{p23} \; e_3 = e_1 \; o^a_{p12} \; (e_2 \; o^b_{p23} \; e_3)$, an operational-level left-permutation rule of $(e_1 \; o^a_{p12} \; e_2) \; o^b_{p13} \; e_3 = (e_1 \; o^b_{p13} \; e_3) \; o^a_{p12} \; e_2$, and an operational-level right-permutation rule of $e_1 \; o^a_{p13} \; (e_2 \; o^b_{p23} \; e_3) = e_2 \; o^b_{p23} \; (e_1 \; o^a_{p13} \; e_3)$, wherein the predicate-level rule comprises a predicate-level combination rule of $(e_1 \; o^a_{p12} \; e_2) \; o^b_{p \wedge p23} \; e_3 = e_1 \; o^a_{p12 \wedge p} \; (e_2 \; o^b_{p23} \; e_3)$, a predicate-level left-permutation rule of $(e_1 \; o^a_{p12} \; e_2) \; o^b_{p13 \wedge p} \; e_3 = (e_1 \; o^b_{p13} \; e_3) \; o^a_{p12 \wedge p} \; e_2$, and a predicate-level right-permutation rule of $e_1 \; o^a_{p \wedge p13} \; (e_2 \; o^b_{p23} \; e_3) = e_2 \; o^b_{p \wedge p23} \; (e_1 \; o^a_{p13} \; e_3)$, wherein $e_i$ comprises a query expression, wherein the $o^a$ and the $o^b$ are join operations, and wherein pij comprises a join predicate between $e_i$ and $e_j$.

18. A database system, comprising:
a database; and
a data query apparatus coupled to the database and comprising;
 a memory storing a plurality of instructions; and
 a processor coupled to the memory, wherein the instructions cause the processor to be configured to:
  receive a data query request;
  generate an original query plan according to the data query request;
  restructure a join predicate in the original query plan by:
   transforming all join predicates of an inner join operation in the original query plan into a conjunctive form;
   combining join predicates having a same input table; and
   combining all join predicates of a non-inner join operation in the original query plan into the join predicate;
  determine basic information of a restructured join predicate in the original query plan;
  determine, based on a join operation rule, a constraint condition of the restructured join predicate in the original query plan;
  determine an equal-cost query plan for the original query plan according to the basic information of the restructured join predicate in the original query plan and the constraint condition of the restructured join predicate in the original query plan; and
  perform querying according to the equal-cost query plan for the original query plan.

19. The database system of claim 18, wherein the instructions further cause the processor to be configured to:
 determine an equal-cost query plan set for the original query plan according to the basic information of the restructured join predicate in the original query plan and the constraint condition of the restructured join predicate in the original query plan; and
 select a query plan from the equal-cost query plan set to perform the querying.

20. The database system of claim 19, wherein the instructions further cause the processor to be configured to:
 obtain a candidate query plan set according to the original query plan; and
 determine the equal-cost query plan set from the candidate query plan set according to the basic information of the restructured join predicate in the original query plan and the constraint condition of the restructured join predicate in the original query plan.

* * * * *

UNITED STATES PATENT AND TRADEMARK OFFICE
CERTIFICATE OF CORRECTION

PATENT NO. : 10,885,034 B2
APPLICATION NO. : 15/992925
DATED : January 5, 2021
INVENTOR(S) : Guoping Wang and Junhua Zhu Page 1 of 1

It is certified that error appears in the above-identified patent and that said Letters Patent is hereby corrected as shown below:

In the Claims

Claim 5, Column 19, Line 44: "= $e_2\ {}^b_{p23}\ (e_1\ o^a_{p13}\ e_3)$," should read "= $e_2\ o^b_{p23}\ (e_1\ o^a_{p13}\ e_3)$,"

Claim 17, Column 23, Line 18: "= $e_2\ {}^b_{p23}\ (e_1$" should read "= $e_2\ o^b_{p23}\ (e_1)$"

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*